US007552430B2

(12) United States Patent
Napier et al.

(10) Patent No.: US 7,552,430 B2
(45) Date of Patent: Jun. 23, 2009

(54) PATCH SEQUENCING

(75) Inventors: Carolyn L. Napier, Seattle, WA (US); Christopher S. Gouge, Redmond, WA (US); David E. Kays, Bellevue, WA (US); Rahul Thombre, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 10/930,656

(22) Filed: Aug. 31, 2004

(65) Prior Publication Data

US 2006/0048130 A1 Mar. 2, 2006

(51) Int. Cl.
*G06F 9/44* (2006.01)
(52) U.S. Cl. .................................. 717/169; 717/170
(58) Field of Classification Search .................. 717/169
See application file for complete search history.

(56) References Cited

U.S. PATENT DOCUMENTS

| | | | |
|---|---|---|---|
| 5,649,200 A | 7/1997 | Leblang et al. | |
| 6,161,218 A | 12/2000 | Taylor | |
| 6,317,880 B1 | 11/2001 | Chamberlain et al. | |
| 6,367,075 B1 | 4/2002 | Kruger et al. | |
| 6,381,742 B2* | 4/2002 | Forbes et al. | 717/176 |
| 6,427,236 B1 | 7/2002 | Chamberlain et al. | |
| 6,434,744 B1 | 8/2002 | Chamberlain et al. | |
| 6,438,749 B1 | 8/2002 | Chamberlain | |
| 6,477,703 B1 | 11/2002 | Smith et al. | |
| 6,493,871 B1 | 12/2002 | McGuire et al. | |
| 6,496,974 B1 | 12/2002 | Sliger et al. | |
| 6,668,289 B2 | 12/2003 | Cheng et al. | |
| 6,772,192 B1 | 8/2004 | Fulton et al. | |
| 6,859,923 B2* | 2/2005 | Taylor | 717/172 |
| 7,073,172 B2 | 7/2006 | Chamberlain et al. | |
| 7,185,332 B1* | 2/2007 | Waldin et al. | 717/170 |
| 7,313,792 B2 | 12/2007 | Buban et al. | |
| 2001/0029605 A1 | 10/2001 | Forbes et al. | |
| 2002/0100036 A1 | 7/2002 | Moshir et al. | |
| 2002/0144248 A1 | 10/2002 | Forbes et al. | |
| 2002/0152229 A1 | 10/2002 | Peng | |
| 2002/0174422 A1 | 11/2002 | Kelley et al. | |
| 2003/0056102 A1 | 3/2003 | Aho et al. | |

(Continued)

OTHER PUBLICATIONS

Rick Borup, Understanding Windows Installer, Oct. 2003, pp. 1-16.*

(Continued)

*Primary Examiner*—Tuan Q Dam
*Assistant Examiner*—Zheng Wei
(74) *Attorney, Agent, or Firm*—Senniger Powers LLP

(57) ABSTRACT

Updating a software product by a plurality of patches. Sequencing data of each patch of the plurality of patches is received from a user such as a patch author. Each patch of the plurality of patches has a defined membership in a portion of the software product and has a defined order in the portion relative to one or more other patches that are members of the portion. The sequencing data indicates a portion of the software product of which the patch is a member and a relative ordering between the patch and one or more other members of the portion. A logical order of application for the plurality of patches is determined based on the received sequencing data. The plurality of patches is applied to the software product according to the determined logical order of application.

40 Claims, 26 Drawing Sheets

U.S. PATENT DOCUMENTS

| | | |
|---|---|---|
| 2003/0126592 A1 | 7/2003 | Mishra et al. |
| 2003/0145317 A1 | 7/2003 | Chamberlain |
| 2003/0220944 A1 | 11/2003 | Schottland et al. |
| 2003/0220992 A1* | 11/2003 | DiRico ........................ 709/221 |
| 2004/0003390 A1* | 1/2004 | Canter et al. ................. 717/178 |
| 2004/0015953 A1 | 1/2004 | Vincent |
| 2004/0088694 A1 | 5/2004 | Ho |
| 2004/0181790 A1 | 9/2004 | Herrick |
| 2004/0210653 A1 | 10/2004 | Kanoor et al. |
| 2005/0050538 A1* | 3/2005 | Kawamata et al. ........... 717/168 |
| 2005/0155031 A1 | 7/2005 | Wang et al. |
| 2005/0257214 A1 | 11/2005 | Moshir et al. |
| 2006/0020938 A1* | 1/2006 | Elcock et al. ................ 717/178 |
| 2007/0079279 A1 | 4/2007 | Gordon et al. |

OTHER PUBLICATIONS

Windows Instller: Benefits and Implementation for System Administration, published: Nov. 1, 2001, pp. 1-73.*

Provos et al., "Improving Host Security with System Call Policies," CiteSeer, CITY-University of Michigan, 15 pages, Nov. 2002, USA.

Provos et al., "Preventing Privilege Escalation," CiteSeer, CITY-University of Michigan, 11 pages, Aug. 2002, USA.

* cited by examiner

PATCH SEQUENCING

TECHNICAL FIELD

Embodiments of the present invention relate to the field of software updates. In particular, embodiments of the invention relate to sequencing patches for updating a software product.

BACKGROUND OF THE INVENTION

With the ever-increasing frequency of software product updates and the continually improving ease of patch distributions and applications, software vendors increasingly find it difficult to correctly update a software application using patches given the variety of prior patches that may or may not have been previously applied to a particular customer's machine. For example, if a software vendor has already released four patches for a particular product, a customer's machine may have none, some, or all of the previously released patches when an installation application is applying a fifth patch to the customer's machine. This creates a problem if the fifth patch requires the presence of one or more of the previous four patches. Moreover, the installation application may not apply the patches in a correct order. Thus, each patch must correctly handle different possible orderings of the earlier patches. Detecting and correctly handling possible orderings of earlier patches may incur prohibitive costs. For instance, the total number of orderings in the case of four earlier patches is roughly 42. But with five earlier patches, the total number of orderings jumps to 207.

Complicating the problem, an installation engine typically applies patches to a software product in the order in which the installation engine encounters the patches on a customer's machine. This chronological ordering of patches is limited to the most basic patching scenarios. A patch may easily install an incorrect version of a file if a user instructs the installation application to apply an older patch for the software product after the installation application had already applied a newer patch to the machine.

In addition, patch authors often attempt to use other attributes of the product (e.g., product version) to enforce some forms of sequencing behavior. But the fact that these attributes were not created to solve sequencing problems limits their effectiveness and flexibility. Thus, while this approach may be effective in blocking incorrect patch applications in some scenarios, its usefulness is generally limited to when a patch is a minor upgrade patch that changes the product version. This approach also provides little functionality for creating a flexible set of patches that may apply a fix or update to several different versions of a software product or patches that may maintain a valid state when the application applies or removes other, perhaps unrelated, patches from the software product.

Furthermore, existing patching techniques do not maintain state information when updates to the product are physically delivered to the product before being installed on the target machine.

Accordingly, a solution that effectively provides sequencing of various patches for updating a software product is desired.

SUMMARY OF THE INVENTION

Embodiments of the invention overcome one or more deficiencies in the prior art by providing, among other things, sequencing of patches for updating a software product. An embodiment of the invention provides a declarative way for users such as patch authors to define a specific ordering of patches when applying the patches to a target machine. Thus, this embodiment of the invention explicitly differentiates between the order in which patches are delivered to the target machine and the underlying logical order of applying the patches to the target machine. In other words, the progression of the software product from one version to the next version and the explicit intent of a patch author define a logical order of the patches. And the logical order of the patches is not influenced by the order in which the target machine encounters the patches.

Aspects of the invention permit a processor such as an installation engine to examine patches already applied to the target machine and the set of patches currently being applied and derive a desired logical order such that the target machine achieves the same result regardless of the order in which the patches are physically delivered and applied to the machine. With patch sequencing data, the installation engine may further determine a relationship between patches such that, for example, applying a first patch of a software product after a second patch has already been applied still registers the first patch but does not overwrite the operations performed by the second patch.

Embodiments of the invention also provide patch sequencing by allowing a patch author to group related patches into a patch family and to declare sequencing relationships between patches in the patch family. According to one embodiment of the invention, the installation engine then uses the family declarations to compute a best state for the target machine given a set of patches available. Depending on the circumstances, the installation engine may ignore some patches or file updates because they are irrelevant due to other patches. However, the installation engines still tracks such patches such that uninstalling the patches does not leave the target machine in an undesirable state.

Defining a logical order of patches also simplifies the patch creation process, as patch authors may confidently generate product updates from a known set of earlier product states (called baselines) instead of considering each possible combination of patches that may exist on a target machine. An embodiment of the invention combines a logical order of patches with contents of each patch so that the installation engine installs correct product resources even when it applies patches in different chronological orders.

Briefly described, a method employing aspects of the invention updates a software product by a plurality of patches. The method includes receiving sequencing data of each patch of the plurality of patches from a user. Each patch of the plurality of patches has a defined membership in a portion of the software product and has a defined order in the portion relative to one or more other patches that are members of the portion. The sequencing data indicates a portion of the software product of which the patch is a member and a relative ordering between the patch and one or more other members of the portion. The method also includes determining a logical order of application for the plurality of patches based on the received sequencing data. The method further includes applying the plurality of patches to the software product according to the determined logical order of application.

In another embodiment of the invention, a system employing aspects of the invention updates a software product by a plurality of patches. The system includes sequencing data for each patch of the plurality of patches. Each patch of the plurality of patches has a defined membership in a portion of the software product and has a defined order in the portion relative to one or more other patches that are members of the portion. The sequencing data indicates a portion of the software product of which the patch is a member and a relative ordering between the patch and one or more other members of the portion. The system also includes a processor configured to receive the sequencing data from a user and to determine a logical order of application for the plurality of patches based on the received sequencing data. The processor is also configured to apply the plurality of patches to the software product in accordance with the determined logical order of application.

In yet another embodiment of the invention, computer-readable media employing aspects of the invention have computer-executable components for updating a software product by a plurality of patches. The computer-readable media include a sequencing component for receiving sequencing data of each patch of the plurality of patches from a user. Each patch of the plurality of patches has a defined membership in a portion of the software product and has a defined order in the portion relative to one or more other patches that are members of the portion. The sequencing data indicates a portion of the software product of which the patch is a member and a relative ordering between the patch and one or more other members of the portion. The sequencing component is further configured to determine a logical order of application for the plurality of patches based on the received sequencing data. The computer-readable media also include an application component for executing the plurality of patches on the software product in accordance with the determined logical order of application.

In further yet another embodiment of the invention, computer-readable media employing aspects of the invention have stored thereon a data structure for updating a software product by a plurality of patches. The data structure includes a patch family field for storing data indicating a portion of the software product that a patch targets for updating the software product. The data structure also includes a sequence field for storing data indicating a relative ordering between the patch and one or more other patches that also target the portion for updating the software product.

Computer-readable media having computer-executable instructions for performing a method of updating a software product by a plurality of patches embody further aspects of the invention.

Alternatively, embodiments of the invention may comprise various other methods and apparatuses.

Other features will be in part apparent and in part pointed out hereinafter.

Figure 1:
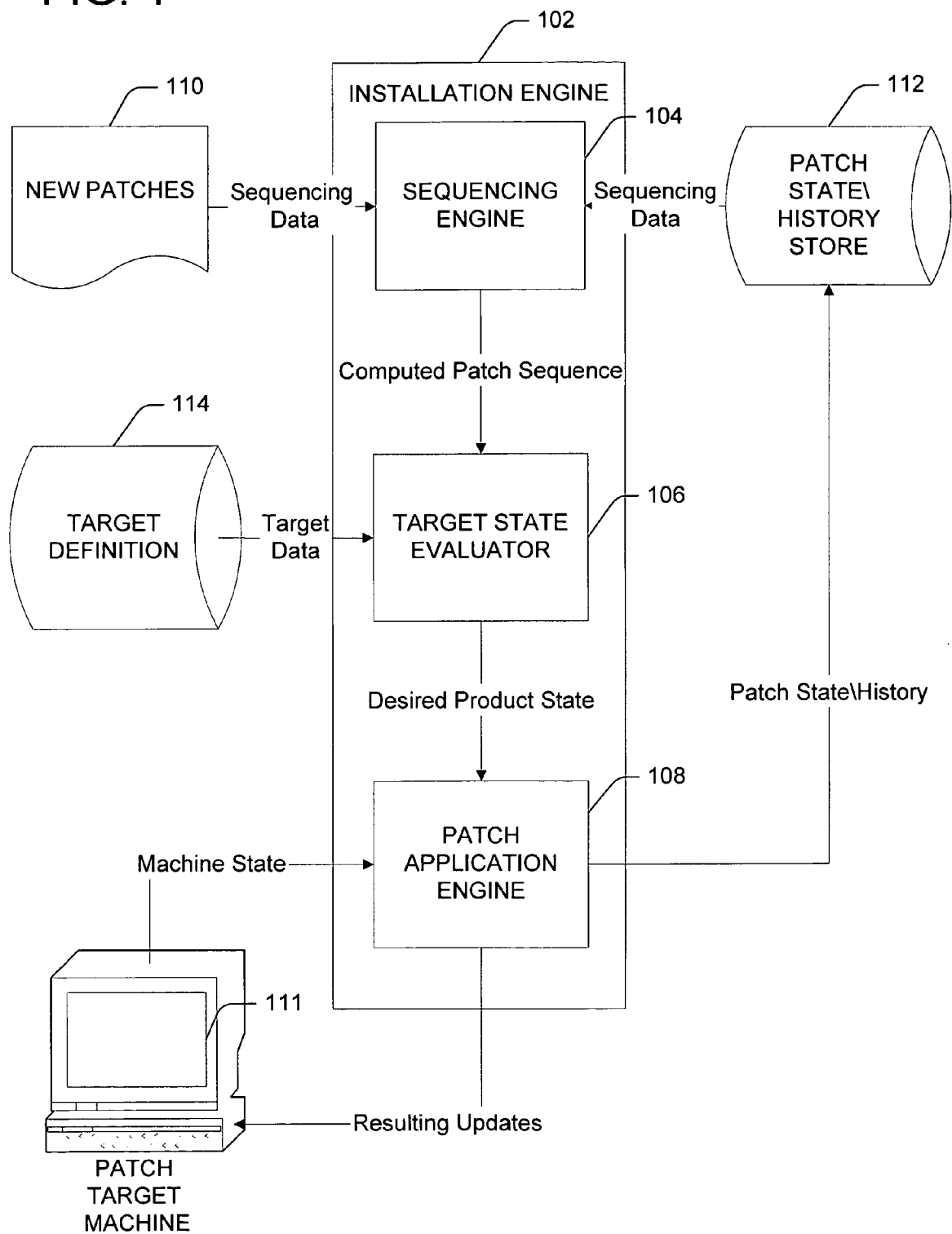
FIG. 1 is a block diagram illustrating an exemplary environment in which embodiments of the present invention may be utilized.

TABLE 1 provides an exemplary format of a PatchSequence table according to one embodiment of the invention.

TABLE 2 provides an exemplary format of a Sequence table according to one embodiment of the invention.

TABLE 3 provides an exemplary format of a SmallUpdateSequence table according to one embodiment of the invention.

TABLE 4 provides an exemplary format of a Predecessor table according to one embodiment of the invention.

TABLE 5 provides exemplary components of an automatically generated sequence value according to one embodiment of the invention.

TABLE 6 provides an exemplary format of a Sequencing table according to one embodiment of the invention.

Corresponding reference characters indicate corresponding parts throughout the drawings.

DETAILED DESCRIPTION OF THE INVENTION

FIG. 1 illustrates an exemplary environment in which embodiments of the invention may be utilized. As shown in FIG. 1, a processor such as an installation engine 102 includes a sequencing engine 104, a target state evaluator 106, and a patch application engine 108. In FIG. 1, the installation engine 102 is attempting to apply a set of new patches 110 to a patch target machine 111. The set of new patches 110 represents one or more updates to a software product installed and/or executed on the patch target machine 111. As illustrated, the sequencing engine 104 of installation engine 102 receives the set of new patches 110. Included in this set of new patches 110 is sequencing data that describes the order in which patches 110 are to be applied to patch target machine 111. From a memory area such as a patch state/history store 112, sequencing engine 104 also receives sequencing data regarding patches already applied to patch target machine 111. By receiving the sequencing data of the new patches 110 and the sequencing data of the patches already applied to patch target machine 111, sequencing engine 104 may compute a logical order of a particular patch relative to other patches to be or already applied to patch target machine 111. Sequencing engine 104 then provides the computed patch sequence (i.e., the logical order of patches) to the target state evaluator 106 of installation engine 102.

Target state evaluator 106 is configured to receive the computed patch sequence from sequencing engine 104 and to receive target data from target definition 114. The target definition 114 specifies in the target data a desired property and state of a product installed or to be installed on patch target machine 111. Accordingly, target state evaluator 106 may determine a desired product state based on the received target data. Furthermore, target state evaluator 106 then provides this desired product state and the computed patch sequence to the patch application engine 108 of installation engine 102.

In addition to the received desired product state and the computed patch sequence, patch application engine 108 also receives a current state of patch target machine 111. Therefore, patch application engine 108 may determine how to apply the set of new patches 110 to patch target machine 111 as a function of the desired product state, the current machine state, and the computed patch sequence. For example, if according to the computed patch sequence, the current state of patch target machine 111 is the same as the desired product state, patch application engine 108 may decide not to apply a patch to patch target machine 111. Patch application engine 108 may also apply the set of new patches 110 to patch target machine 111 according to the computed patch sequence such that patch target machine 111 achieves the desired product state.

After patch application engine 108 determines an action for patch target machine 111 and, for example, applies the set of new patches 110 to update patch target machine 111, it determines a new current state of patch target machine 111 and stores this new current state in the patch state/history store 112 as a new patch state/history of patch target machine 111. Patch state/history store 112 may then supply this new patch state/history to sequencing engine 104 during the next round of patch updates.

In an embodiment of the invention, patches may generally be grouped into three distinct classifications: small update patches, minor upgrade patches, and major upgrade patches. The classifications represent the type and amount of changes made to both the software product's resources and the software product's identity. A small update patch is a patch that fixes a small set of critical bugs or security issues in a software product. For example, a small update patch may not change a product code or product version of a software product. The purposes of such a patch are to make relatively small-scale changes to the product and to update a limited number of product's files. Because of this, small update patches may represent disjoint sets of updates to a software product, which make it difficult to achieve known software product states since the identity of the software product remains unchanged.

A minor upgrade patch is a patch that provides significant updates to a software product. That is, a minor upgrade patch is typically a general service release to a software product and is typically a collection of different software product bugs, fixes, or other enhancements. For example, such a patch increments a product version of the product but does not change a product code, therefore producing a known software product state that may be targeted. Minor upgrade patches usually update many files in a product and usually incorporate changes made by prior small update patches for the product. A major upgrade patch is a patch that makes many changes to a software product such that the software product gets a new identity. For example, a major upgrade patch may change a product code of a product code of a software product and therefore may change a product version if desired.

Any type of patches (e.g., major upgrade, minor upgrade, or small update) may be cumulative or non-cumulative. Cumulative patches incorporate change made by prior patches and target several versions of a product (including the first version of the product). Non-cumulative patches do not include changes made by prior patches and target the most recent version of a product. Some patches may combine both the cumulative and non-cumulative behaviors, for example, by incorporating changes from patches released after a certain date or version.

Figure 2:
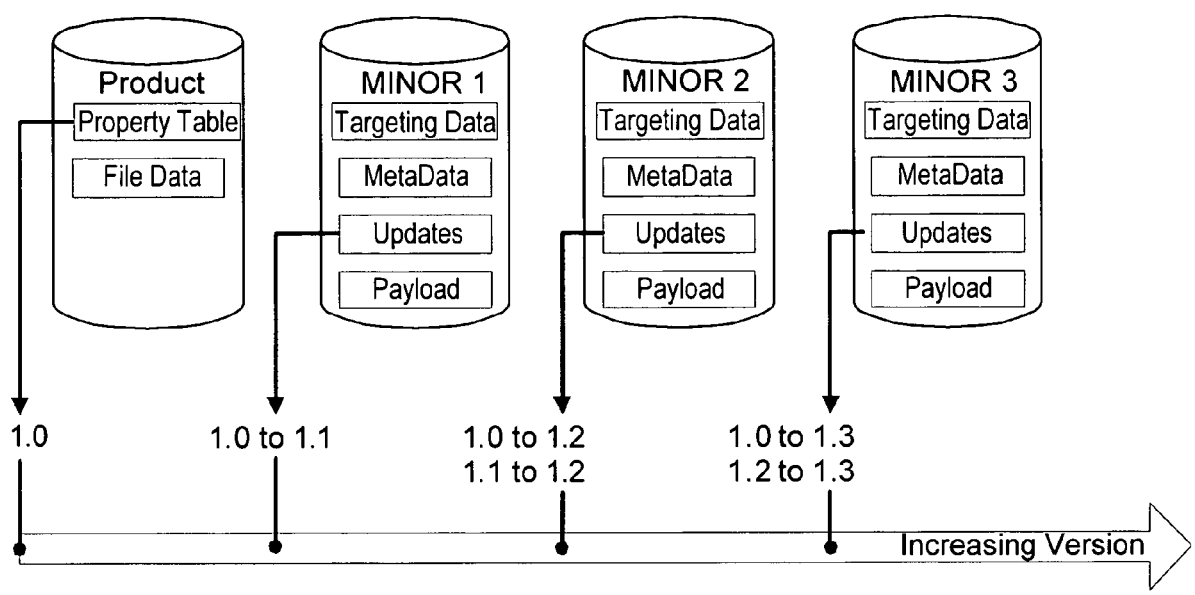
FIG. 2 is a block diagram illustrating an exemplary order of patches based on product versions according to one embodiment of the invention.

Minor upgrade patches form a framework for the sequencing logic of patches. When sequencing engine 104 receives a set of minor upgrade patches to apply, it examines a new targetable state (e.g., a new product version value) for each patch and generates a single optimal order of application for the minor upgrade patches based on a set of resultant versions. FIG. 2 illustrates an example of such a logical sequencing of a single file with multiple version targets.

Figure 3:
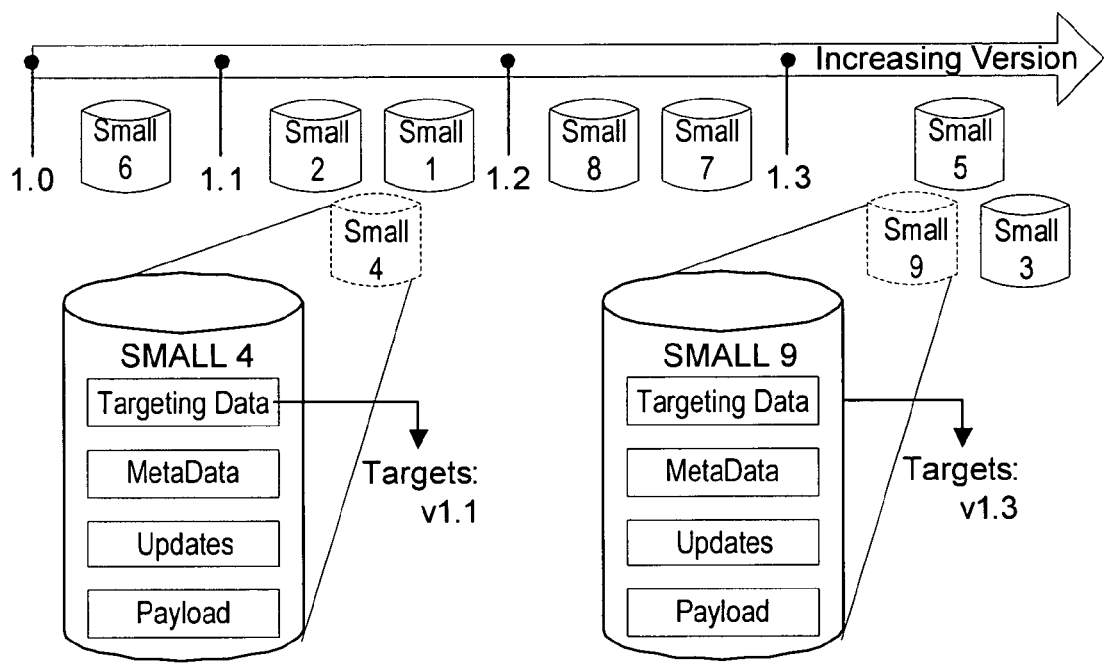
FIG. 3 is a block diagram illustrating an exemplary order of small update patches based on product versions they target according to one embodiment of the invention.

The addition of small update patches to a set of patches for a product does not change this fundamental order defined by product version values. These small update patches by definition do not change a product version when installation engine 102 applies them to the product. However, the product version value may still determine the applicability of small update patches. Specifically, small update patches include as part of their target validation data a declaration of the product version(s) to which they apply. This version targeting data provides a preliminary order when determining an optimal order of application for the small update patches, as exemplarily illustrated in FIG. 3.

When multiple small update patches apply to the same version of a product, the product version value is the same for the small update patches. In the example illustrated in FIG. 3, small update patches 1, 2, and 4 apply to version 1.1 of the product, but sequencing engine 104 may not be able to determine the logical order to apply these patches. Therefore, the product version value alone may not provide enough information about small update patches for installation engine 102 to clearly determine an optimal ordering of patches. To define a logical order for a set of small update patches (or a combination of small update patches and minor upgrade patches), it may be desirable to have information regarding which patches update similar functionalities, what restrictions exist for a logical order of related patches, when changes made by one patch are included in another patch, and what to do when patches are uninstalled. In an embodiment of the invention, sequencing data of a patch provides such information.

Figure 4:
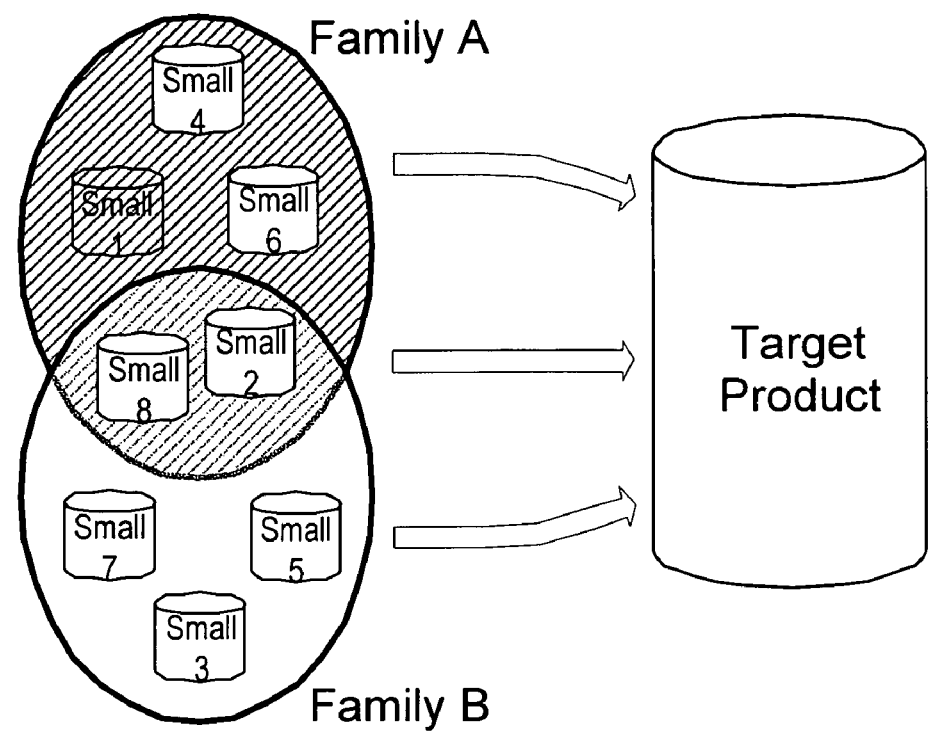
FIG. 4 is a block diagram illustrating an exemplary group of related patches within a patch family according to one embodiment of the invention.

According to an embodiment of the invention, sequencing data provides a patch family that specifies a high-level grouping logic for a sequencing scenario. Particularly, a patch family enables a user such as a patch author to provide explicit instructions that define a role of a particular patch for a target product. A patch family defines a portion of the software product that includes the same, similar, or related functionalities. Accordingly, patches within the patch family update the portion of the software product in a specific order relative to other patches in the same patch family. In most cases, a patch family for a product includes patches that apply to the product. This "single-product/single-family" model is often capable of meeting most servicing models of a product. But in some cases, a patch author may decide to subdivide a set of patches for a product into several smaller families (or alternatively, create families that span multiple products) to handle more complicated sequencing scenarios. FIG. 4 illustrates an example of such a multi-family model. In one further alternative embodiment of the invention, installation engine 102 allows installation of patches that do not employ grouping of patches based on the components and/or functionalities they update.

After a patch author assigns a patch to a particular patch family (or multiple patch families), he or she may declare sequencing relationships between related patches to prevent unrelated patches from interfering with each other and provide information on which small update patches are included in a minor upgrade patch such that older patches may be replaced by newer patches. Sequence numbers provide ordering information for a patch family. Thus, the patch author may define ordering dependencies of patches within a patch family. The patch author may define ordering relationships by providing each patch within a family a numeric value indicating its sequence within the family. Sequencing engine 104 then sort patches within the patch family by this numeric value (e.g., sequencing engine 104 sequences smaller numbers before larger numbers) to determine an appropriate logical order for applying the patches. Sequence numbers in a patch family do not override actual targeting information of a patch. For example, installation engine 102 applies a patch targeted at version 1.2 of a product after applying a patch that transforms the product to version 1.2 and before applying a patch that transforms the product to version 1.3 (or higher). Thus, sequence numbers apply within a particular target version. Moreover, sequence numbers in a patch family usually increase over time as installation engine 102 usually applies later patches to a target machine after applying earlier patches to the target machine.

In an embodiment of the invention, since each patch declares its own family membership, future patches may add additional patch families to a product without affecting an earlier patch's behavior. Because of this extensibility, complex products (wherein a patch author anticipates multiple patch families) may initially begin with a single patch family and add additional families as desired. There are several scenarios where the patch author may choose to create new families for a product. For example, the patch author may intend to create unrelated patches for independent portions of a product and decide to manage the patching of each portion independently. In another example, independent teams on distinct schedules may create patches for various subsets of a product's functionality and implementation. Therefore, creating a single logical order in such a scenario may be difficult. In yet another example, several related products may share certain functionalities, and each product may desire to update the shared functionalities without releasing a patch for the other products.

Figure 5:
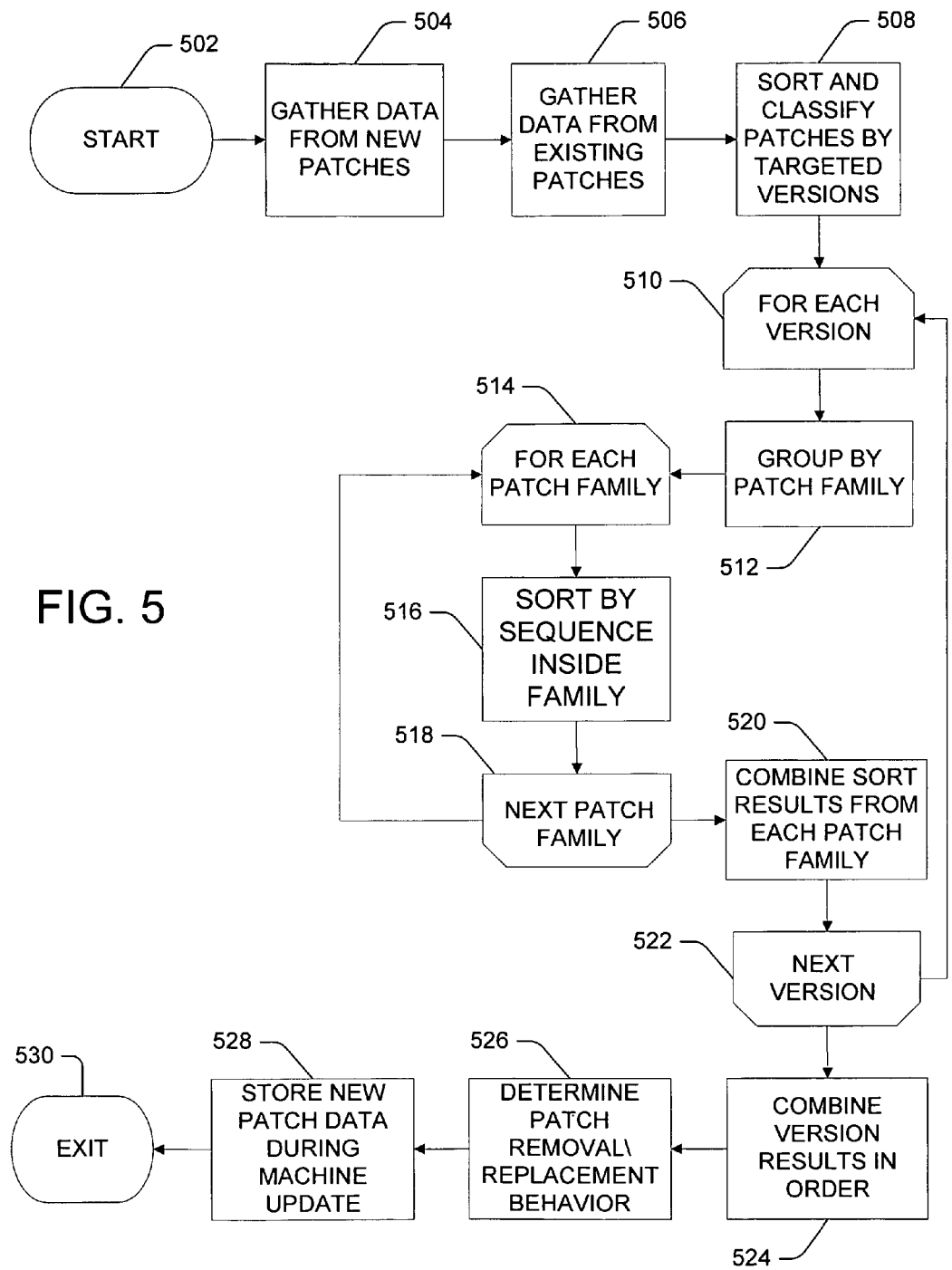
FIG. 5 is an exemplary flow diagram illustrating process flow according to one embodiment of the invention for sequencing a plurality of patches.

FIG. 5 illustrates an exemplary process flow that installation engine 102 utilizes to determine a logical order of patches for applying the patches to a target machine according to one embodiment of the invention. At 502, the process starts. At 504, data regarding new patches to be applied to a target machine is gathered. At 506, data regarding existing patches already applied to the target machine is gathered. Data regarding each new or existing patch includes sequencing data that allows sequencing engine 104 to calculate a logical order of patch applications. For major and minor upgrade patches, a table corresponding to each patch stores the sequencing data. Specifically, such a table, referred to herein as a PatchProperty table, includes a product code, a version identifier, and a language value. The product code is the globally unique identifier (GUID) of the software product. For each small update patch, a PatchSequence table associated with the patch declares the patch's membership in a patch family. That is, the membership list of a patch family is not stored at a single memory area; rather, each small update patch declares one or more families to which it belongs. This means that a patch family is extensible and that family membership is flexible. It is also noted that a minor upgrade patch may have an associated PatchSequence table for supersedence determination. TABLE 1 provides an exemplary format of the PatchSequence table according to one embodiment of the invention.

TABLE 1

Exemplary Format of the PatchSequence Table

| Column Name | Nullable? | Key? | Type | Description |
|---|---|---|---|---|
| PatchFamily | No | Yes | Identifier | Defines a patch family for this patch. Patches are sequenced within a patch family. |
| ProductCode | Yes | Yes | Identifier (e.g., GUID) | An optional identifier that causes sequencing engine 104 to process this PatchFamily value when the patch applies to the specified ProductCode. |
| Sequence | No | No | Version | Sequence of this patch within this PatchFamily value. |
| Attributes | Yes | No | Integer | Attributes for this PatchFamily value. |

The identifier value provided in the PatchFamily column indicates this particular patch's membership in a patch family having this identifier. Sequencing engine 104 sorts patches sharing a PatchFamily value and targeting the same product version by a sequence version number within the patch family. And patch application engine 108 applies these patches to a target machine in increasing order within the patch family. Sequencing engine 104 also uses the PatchFamily value to determine which patches supersede earlier patches. A patch may belong to multiple patch families (e.g., when a patch is applied to multiple targets or when a patch includes multiple fixes that were previously delivered independently in different patch families).

In an embodiment of the invention, the PatchFamily value does not have any meaning to installation engine 102 beyond that of an identifying string. Therefore, when defining a new patch family, it is desirable to use a descriptive identifier that indicates the functionality updated by the patch, the target product, or some other useful information about the patch. In addition, the PatchFamily value is unique within a particular target product's set of patches. If the same PatchFamily value exists for unrelated products, this duplication does not cause a problem (even if both products are installed on the same machine) because patches that are queried for their family memberships are limited to patches that are applicable to a particular product (e.g., as determined by the patch applicability rules). That is, each product sees its own patches and is not aware that another product has a patch family with the same identifier.

If a single patch targets a set of related products (e.g., a suite of related products, a set of localized versions for a product, etc.), then a patch family may span multiple products and the PatchFamily value for a patch targeting any product is desired to be unique across the set of patches targeting any of the products. For example, if there is an English version and a German version and a single patch may at some point update both versions, then the PatchFamily value of any patch for the English version is desired not to be shared by a patch targeting the German version unless both patches are members of the same patch family. This allows future patches to not inherit unintended sequencing information due to interference with a patch that targets both languages of the product.

Patches for shared or redistributable components that may be incorporated into a variety of products are desired to use a PatchFamily value that is reasonably expected to be globally unique, such as a name based on a component's friendly name or company name.

Returning to TABLE 1, the value provided in the ProductCode column indicates that the PatchFamily value applies when this particular patch targets a product having this ProductCode value. If the patch targets a product with a different ProductCode value, then sequencing engine 104 ignores this value when calculating the patch sequence. The ProductCode column may be null to indicate that this PatchFamily value applies to various targets regardless of their product codes. If a PatchFamily value has both a null ProductCode row and a matching ProductCode row, then sequencing engine 104 may use the row with the matching ProductCode. For a patch that targets multiple product codes, multiple rows may exist in this ProductCode column for a given patch family—one for each product code targeted by the patch.

The Sequence column in the PatchSequence table allows a patch author to define ordering relationships between patches in this PatchFamily value. The desired ordering information within this PatchFamily value is declarative. That is, each patch uses the Sequence column to declare a position in the application order relative to other patches having this PatchFamily value. Sequencing engine 104 then combines the information to determine a desired sequence in this patch family. The PatchSequence table stores the Sequence value as a string that includes four components, each ranging from 0 to 65535 (inclusive) and delimited by periods. If a component in the string exceeds the value range, then the final sequence is undefined. In an embodiment, the second, third, and fourth components of the Sequence value are optional (and are assumed to be 0 if absent). For example, sequencing engine 104 considers the Sequence values "1" and "1.0.0.0" to be the same Sequence value. Sequencing engine 104 compares Sequence values based on a numeric interpretation of the fields. Further to the example, sequencing engine 104 considers the Sequence values "1.2.3.4" and "1.02.3.4" as different representations of the same Sequence value.

In most cases, Sequence values for patches increase over time such that installation engine 102 applies newer patches after older patches. In certain scenarios, a new patch may have a Sequence value below that of another existing patch. Nonetheless, a patch-authoring tool may generally use a patch creation date as a component of a Sequence value. In addition, a Sequence value may have no inherent meaning to installation engine 102 and may not correspond to a particular product's property. However, a patch author may create Sequence values based on a meaningful algorithm for management purposes. For example, the patch author may decide to use a combination of product version and date of patch release to create Sequence values for patches that target a product.

The Attributes column of the PatchSequence table allows a patch author to selectively activate specific behaviors of sequencing engine 104 when it processes the patch. For example, the presence of a PatchSequenceSupersedeEarlier attribute in this column indicates that the patch supersedes updates provided by patches with lesser Sequence values in the same PatchFamily value (e.g., because this particular patch includes fixes provided by earlier patches in the same patch family). However, this attribute does not direct sequencing engine 104 to automatically supersede earlier patches as a whole because some of the earlier patches may belong to multiple patch families and this attribute applies to a specific patch family. It is noted that even if the PatchSequenceSupersedeEarlier attribute is set, a small update patch may not supersede a minor upgrade or major upgrade patch.

Figure 6:
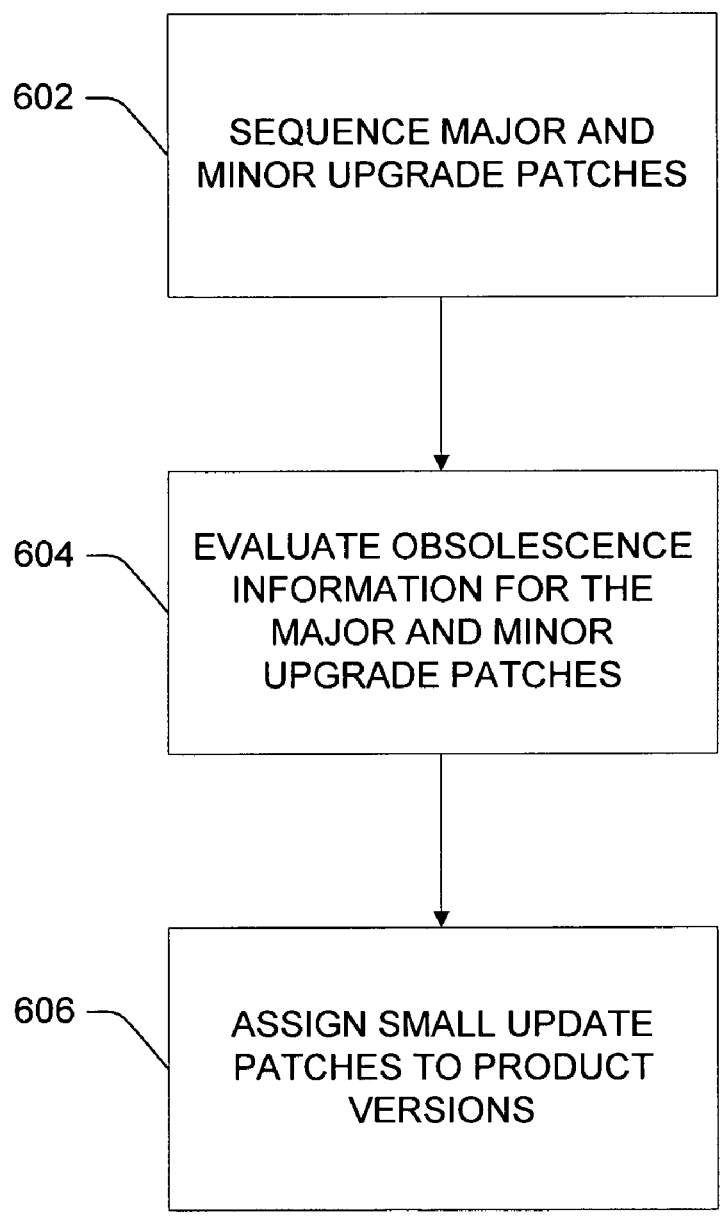
FIG. 6 is an exemplary flow diagram illustrating process flow according to another embodiment of the invention for sorting and classifying patches based on targeted product versions.

Referring again to FIG. 5, both new patches and existing patches are sorted by their targeted versions at 508. FIG. 6 further exemplarily illustrates this process. At 602, major and minor upgrade patches are sequenced. Specifically, sequencing engine 104 searches the list of new and existing patches for major and minor upgrade patches. Sequencing engine 104 then queries each patch flagged as a major upgrade or minor upgrade patch to determine a resultant version number of the product after applying the patch to the product. After sequencing engine 104 chooses the set of major upgrade and minor upgrade patches, it sorts major upgrade patches by the resultant product code and minor upgrade patches by the resultant version number when applying these patches to the product. In an embodiment of the invention, installation engine 104 may apply at most one new major upgrade patch in any transaction. Moreover, installation engine 104 applies a new major upgrade patch after applying existing major upgrade patches, assuming that it applies the new major upgrade patch to the product after evaluating the existing major upgrade patches.

According to an embodiment of the invention, to sequence major and minor upgrade patches, sequencing engine 104 uses a temporary Sequence table to track patches, their states, and their final sequence. TABLE 2 provides an exemplary format of the Sequence table according to one embodiment of the invention.

TABLE 2

Exemplary Format of the Sequence Table

| Column Name | Nullable? | Key? | Type | Description |
|---|---|---|---|---|
| PatchGUID | No | Yes | GUID | The Patch GUID of the patch being sequenced. |
| PatchType | No | No | Integer | Indicates the type of patch (e.g., major upgrade, minor upgrade, or small update). |
| ResultantProductCode | Yes | No | GUID | The product code GUID resulting from application of this patch. |
| ResultantVersion | Yes | No | Version | The product version resulting from application of this patch. |
| MinorOrder | Yes | No | Integer | The order of this major or minor upgrade patch relative to other major or minor upgrade patches, or the order of this minor update patch within a version. |
| FinalOrder | Yes | No | Integer | The calculated final order of the patch across versions. |
| State | Yes | No | Integer | Indicates that the patch has been obsoleted or superseded. |
| Other | | | | Additional information for internal patch management not related to sequencing (such as patch path, current state, etc.). |

The PatchGUID column of the Sequence table stores the GUID of the patch. This GUID is the primary key value for the Sequence table. Each major upgrade, minor upgrade, or small update patch has one row in this column. The PatchType column indicates a type of the patch, which, for example, may be 1 for a major upgrade patch, 2 for a minor upgrade patch, and 3 for a small update patch. The ResultantProductCode column stores a value that specifies the product code of the software product that is creates if the patch is a major upgrade patch. The ResultantVersion column of the Sequence table stores a value that specifies a version of a target product that the patch creates if it is a major or minor upgrade patch. If the patch is a small update patch, the ResultantVersion column stores a computed version to which this patch applies. The MinorOrder column of the Sequence table stores an integer indicating a sequence of this major or minor upgrade patch relative to other major or minor upgrade patches. Sequencing engine 104 sequences smaller values before larger values. Sequencing engine 104 computes this value during the sequencing process based on a resultant version of the major or minor upgrade patch. For small update patches, the value stored in the MinorOrder column indicates an order of this small update patch relative to other small update patches that target the same product version. Sequencing engine 104 computes this relative ordering when sorting small update patches based on their PatchFamily values. Each set of small update patches that target a distinct version of the product has its own set of MinorOrder values. Sequencing engine 104 uses the MinorOrder value for internal tracking during the sequencing process. The value in the FinalOrder column indicates a final sequence of patches. The FinalOrder column is null if sequencing engine 104 has not yet sequenced the patch or if the patch is obsolete or has been superseded. The value in the State column indicates the state of the patch during sequencing. This value may be 0 or null if the patch is valid and sequenced, 1 if the patch has been obsoleted by another patch, 2 if the patch has been superseded by another patch, or 3 if the patch does not apply to this product.

Sequencing engine 104 populates the Sequence table by taking data of each candidate patch (e.g., PatchGUID, PatchType, etc.) and creating a new row in the Sequence table, one row for each patch. If the patch is a major upgrade or minor upgrade patch, sequencing engine 104 determines the product version after the patch is applied and adds this product version to the corresponding row in the ResultantVersion column. Additionally, for major upgrade patches, sequencing engine 104 determines the product code after the patch is applied and adds this value to the corresponding row in the ResultantProductCode column.

Other columns may initially include null values. To sort the Sequence table, sequencing engine 104 queries the Sequence table for major upgrade patches. Sequencing engine 104 then sorts the major upgrade patches by placing integer values in the MinorOrder column in a correct sequence. Moreover, sequencing engine 104 sequences any existing major upgrade patches in their existing patch order. After sequencing engine 104 sorts the major upgrade patches, it similarly sorts minor upgrade patches. Thus, the MinorOrder values for the minor upgrade patches fall after those for the major upgrade patches. It is also noted that even though the Sequence table is a temporary table, it includes the final result of patch sequencing. Accordingly, sequencing engine 104 may destroy the Sequence table after it has retrieved desired sequencing data.

Turning to 604, obsolescence information for major and minor upgrade patches is evaluated. In particular, after determining the final set of major and minor upgrade patches, sequencing engine 104 evaluates these patches in reverse order based on their MinorOrder values in the Sequence table (i.e., highest MinorOrder value first) to determine if any patch explicitly obsoletes an earlier patch. For example, sequencing engine 104 examines the PatchProperty table of each patch to determine the PatchGUID(s) obsoleted by the patch. If one of the obsoleted PatchGUIDs appears in the patches listed in the Sequence table and is sequenced earlier than the obsoleting patch, sequencing engine 104 marks the obsoleted patch as obsolete in the State column of the Sequence table. Sequencing engine 104 then withdraws from evaluating any patch that has been marked as obsolete for further obsolescence information. In an embodiment of the invention, sequencing engine 104 does not evaluate any patch that results in a version less than the base version of the product.

At 606, small update patches are assigned to various product versions. In particular, after sequencing engine 104 determines the set of major and minor upgrade patches, there is a set of product versions through which the product progresses if installation engine 102 applies the major and minor upgrade patches individually in multiple transactions. Since each small update patch may target one or more of these product versions, sequencing engine 104 may divide the collection of small update patches into sets, with each set including one or more small update patches that target one of the potential versions that result from applying the major and minor upgrade patches. Sequencing engine 104 further assigns a small update patch that targets multiple versions of the same product to the set of small update patches for the highest version that this particular small update patch supports.

To accomplish assigning small update patches to product versions, sequencing engine queries the Sequence table in reverse order of the MinorOrder values (i.e., highest MinorOrder value first). For each product version, sequencing engine 104 queries each small update patch to determine its applicability rules. If the product version satisfies the patch's applicability rules for the product identity (e.g., the product code and the product version), sequencing engine 104 assigns this small update patch to that product version by inserting a row or set of rows in a SmallUpdateSequence table based on the data stored in the small update patch's PatchSequence table. Sequencing engine 104 then removes this small update patch from further consideration when evaluating other product versions. A small update patch whose applicability rules are not satisfied by any potential version is not applicable to the product and is not sequenced.

The SmallUpdateSequence table is a temporary table used to determine the version applicability of a small update patch and to sort small update patches within a target version set. TABLE 3 provides an exemplary format of the SmallUpdateSequence table according to one embodiment of the invention.

TABLE 3

Exemplary Format of the SmallUpdateSequence Table

| Column Name | Nullable? | Key? | Type | Description |
|---|---|---|---|---|
| PatchGUID | No | Yes | GUID | The Patch GUID for the small update patch being sequenced. |
| TargetVersion | No | Yes | Version | The product version set into which this small update patch has been sorted. |
| PatchFamily | No | Yes | Identifier | The PatchFamily value of this small update patch. |
| Sequence | No | No | Version | The sequence number associated with this small update patch for this PatchFamily value. |
| Order | Yes | No | Integer | The calculated sequence order in this PatchFamily value and product version set. |

The PatchGUID column of the SmallUpdateSequence table stores the GUID of the small update patch. Along with the TargetVersion and PatchFamily values, the PatchGUID value defines a primary key for the SmallUpdateSequence table. Sequencing engine 104 copies the PatchGUID value from the PatchSequence table associated with this particular small update patch. The value in the TargetVersion column specifies a version of the product that the small update patch targets. The identifier in the PatchFamily column of the SmallUpdateSequence table indicates one of the one or more patch families to which this small update patch belongs. A patch that belongs to multiple patch families has one row for each PatchFamily value in the SmallUpdateSequence table. Sequencing engine 104 copies the PatchFamily value from the PatchSequence table associated with this small update patch. The value in the Sequence column specifies a relative sequence of this small update patch within the patch family. Sequencing engine 104 similarly copies this value from the PatchSequence table associated with this small update patch. The value in the Order column specifies a relative sequence of this small update patch within the patch family in an integer form. Sequencing engine 104 computes this value during the sequencing process. This value may vary across installation instances because it depends on what other small update patches are applied to the product. A null Order value indicates that sequencing engine 104 has not yet sequenced this small update patch within this patch family.

Sequencing engine 104 populates the SmallUpdateSequence table by querying each potential small update patch for the product. If a small update patch lists the product code of the current product, sequencing engine 104 then processes this patch. Otherwise, sequencing engine 104 marks this patch as inapplicable in the Sequence table. For each distinct version of the target product after applying a combination of major and minor upgrade patches, sequencing engine 104 queries patch applicability rules. If the applicability rules in a small update patch are satisfied by this specific product code, product version, and product language, this small update patch applies to this target version. If none of the rules validates against this specific software product identity, this small update patch is inapplicable to this particular target version but still may be applicable for other target versions.

After determining that a specific small update patch applies to a specific target version, for each row in the PatchSequence table of this patch that has a ProductCode value equal to the current product code, sequencing engine 104 inserts the PatchFamily and Sequence values into the SmallUpdateSequence table with the PatchGUID value equal to the patch's GUID and the TargetVersion value equal to the target version being queried. After sequencing engine 104 evaluates ProductCode-specific rows, it similarly copies rows that do not refer to a specific product code, unless a product-code specific row for the PatchFamily has already been copied.

Returning to FIG. 5, after major upgrade, minor upgrade, and small update patches have been sorted by target versions, small update patches within each version are sorted to determine an order of their applications against a specific target version. Thus, at 510, for each target version, small update patches are grouped by their patch families at 512. At 514, for each patch family in this target version, small update patches within this patch family are sorted at 516. To sort small update patches within a patch family, sequencing engine 104 independently queries each distinct PatchFamily value and assigns a value from 1 to N to rows in this patch family, where N is the number of rows in the family. Sequencing engine 104 calculates the sort order based on the Sequence value of the row relative to other rows in the same patch family. Sequencing engine 104 may destroy the SmallUpdateSequence table after it assigns small update patches to product versions.

Turning to 518 of FIG. 5, if there is an additional patch family in this particular target version, then the process returns to 514. If there is not an additional patch family in this target version, then the process proceeds to 520. At 520, the sorted patch families within this target version are then combined to generate a single ordered list for the target version. Patches that belong to multiple patch families are cross-referenced such that the final ordered list includes the sorting results from different patch families. In an embodiment of the invention, sequencing engine 104 uses a temporary Predecessor table to sort small update patches within a patch family. TABLE 4 provides an exemplary format of the Predecessor table according to one embodiment of the invention.

TABLE 4

Exemplary Format of Predecessor Table

| Column Name | Nullable? | Key? | Type | Description |
|---|---|---|---|---|
| PatchGUID | No | Yes | GUID | The GUID of the current patch. |
| Predecessor | Yes | Yes | GUID | The base Patch GUID. |

The PatchGUID column of the Predecessor table includes a value that indicates the GUID of a candidate small update patch. The Predecessor column of the Predecessor table includes a value that indicates the GUID of another patch in the same patch family that is sequenced before the patch referenced in the PatchGUID column. If the Predecessor column is null, then the patch referenced in the PatchGUID column does not have a sequencing restriction against another patch within the same patch family.

Sequencing engine 104 populates the Predecessor table by querying the SmallUpdateSequence table for a set of patches in a particular patch family within a particular target version. Sequencing engine 104 retrieves these patches in order of ascending Order values. For each row retrieved from the SmallUpdateSequence table, sequencing engine 104 inserts the PatchGUID value of the retrieved row into the PatchGUID column of a new row in the Predecessor table. Sequencing engine 104 then inserts the PatchGUID value of a previous row in the SmallUpdateSequence table into the Predecessor column of the new row in the Predecessor table. For the first row retrieved from the SmallUpdateSequence table, the Predecessor column is null. This process is repeated for each distinct family targeting the product version. The Predecessor table then includes the dependencies between patches targeting the particular target version based on their family membership.

One embodiment of the invention uses a frontier-traversal algorithm to determine a final ordering of small update patches within a target product version. Sequencing engine 104 determines the final ordering of small update patches within the target product version by generating a partial-order relationship between the one or more patches based on the received sequencing data and generating a sorted order based on the partial-order relationship. Particularly, the frontier in each step includes an equivalence set having small update patches referenced by rows with null Predecessor values. Sequencing engine 104 performs a query for small update patches where Predecessor values associated with the patches are null. Sequencing engine 104 then places these small update patches at the end of the sorted patch list. To form the next frontier, sequencing engine 104 further clears Predecessor values of any rows in the Predecessor table that reference these small update patches as predecessors. This process repeats for other patches. In an embodiment of the invention, if at any time sequencing engine 104 may not retrieve a row from the Predecessor table yet the Predecessor table is not empty, the patch application may fail. Also, since the Predecessor table is a temporary table, sequencing engine 104 may destroy the Predecessor table after it has generated the final patch sequence. For example, sequencing engine 104 may clear the Predecessor table after it has evaluated each target version.

After the sorted patch families within the target version are combined, it is determined at 522 if there is an additional target version for consideration. If there is an additional target version, the process returns to 510. Otherwise, the process proceeds to 524. At 524, the sorted groups for each target version are combined with major and minor upgrade patches to create a single list of ordered patches that apply to the product. Specifically, sequencing engine 104 may proceed through each major or minor upgrade patch by querying the Sequence table for major upgrade patches in increasing order of MinorOrder values. After sequencing engine 104 sequences major upgrade patches, it queries the Sequence table for minor upgrade patches in increasing order of MinorOrder values. For each resultant version, sequencing engine 104 retrieves from the Sequence table the sorted set of small update patches applicable to that version. For each retrieved major upgrade, minor upgrade, or small update patch, sequencing engine 104 sets the FinalOrder value for the patch in the Sequence table to the next integer value. After applying these patches, the FinalOrder column of the Sequence table defines a single list of sequenced patches.

In an embodiment of the invention, when installation engine 102 applies the set of new patches 110 to a product that has been updated by previous patches without sequencing data, it places patches without sequencing data first in the patch sequence (e.g., in the order that these patches were applied to the product). That is, installation engine 102 sequences and places patches with sequencing data after existing patches without sequencing data. This is the case even if the transaction provides a new set of patches that include a mixture of sequenced and un-sequenced patches and even if installation engine 102 applies the new un-sequenced patches to the product after applying the new sequenced patches to the product. In another embodiment of the invention, sequenced patches target a product code, upgrade code, product language, and product version that result from applying earlier un-sequenced patches to a product.

At 526 of FIG. 5, a patch removal or replacement behavior is determined. Sequencing engine 104 evaluates relationships between patches to determine if one or more patches are no longer desired. Sequencing engine 104 marks such undesired patches as superseded and removes these patches from the logical order of patches. However, these patches may still apply to the product if they are desired in the future.

Superseding a patch is a method for controlling the lifetime of patch content based on other patches that apply to the same product. Each patch applied to the product declares if it supersedes an earlier patch in a patch family. Sequencing engine 104 then uses this data to determine the lifetime of the earlier patch. A minor upgrade patch or a small update patch may supersede an earlier small update patch. When a small update patch is superseded, installation engine 102 does not apply its content to the product. If the patch later becomes not superseded (e.g., by removing a later superseding patch), installation engine 102 may reapply its content to the product. In addition, while a minor upgrade patch may be flagged as superseded, installation engine 102 may apply its content to the product because other patches may expect to target the product version created by this minor upgrade patch or later updates may not have the desired data to bring the product to a correct version without the binary data included in the flagged minor upgrade patch. When patches are grouped and sequenced within a family, a patch may declare that it supersedes an earlier patch within the family by specifying the PatchSequenceSupersedeEarlier flag in the Attribute column of the associated PatchSequence table. This indicates that the patch incorporates changes released by the earlier patch. Therefore, the earlier patch is no longer desired.

Superseding a patch is different from obsoleting the patch. In an embodiment of the invention, non-sequenced patches may use obsolescence to remove patches, while patches with sequencing data use supersedence to control a patch lifetime behavior. In other words, a patch without sequencing data may obsolete another patch without sequencing data regardless of if there is a relationship between the two patches. But a patch may supersede another patch that is a member of the same patch family and that falls earlier in the sequence within the family. Accordingly, sequencing engine 104 may ignore obsolescence information for patches including sequencing data. Moreover, patches are obsoleted by explicitly listing their patch codes in the PatchProperty table of another patch. Thus, patches to be obsoleted are desired to be known ahead of time. In contract, patches are superseded by their memberships in a particular patch family and their positions in that family. This allows patches to target earlier versions of a product even though future updates may still replace these patches. Additionally, unlike obsolescence, a patch author may supersede a patch for a target product but not other target products.

The chaining behavior is also different between supersedence and obsolescence. In an example of three patches A, B, and C, patch A obsoletes patch B, and patch B obsoletes patch C. If the three patches are applied to a target product in the order C, B, A, then patch A ends up applied to the target product. This is because the application of patch B causes patch C to obsolete, and the application of patch A marks patch B as obsolete. However, if the patches are applied in the order A, B, C, then no patch is removed, and the three patches will apply to the target product. When patch A is applied, patch B is unknown (i.e., it has not yet been applied). Similarly, when patch B is applied, patch C is unknown. Therefore, none of the patches is obsoleted, and the three patches remain applicable to the product. If the patches are installed in yet another order (e.g., B, A, C), another set of patches may be applicable.

In contrast, if patch A supersedes patch B and patch B supersedes patch C, then after the three patches are applied, patch A will apply to the product regardless of the order in which the patches are applied. The definition of supersedence indicates that a superseding patch supersedes patches with lower sequence numbers in the same family after the patches are sequenced correctly. Thus, if patch B supersedes patch C, then patch B has a higher sequence number than patch C in the patch family. If patch A supersedes patch B, then patch A has a higher sequence number than patch B in the patch family as well. By logic, patch A has a higher sequence number than patch C. Therefore, patch C is in fact superseded by both patch A and patch B such that if patch B is removed by patch A, there is no effect on the state of patch C.

Another difference between supersedence and obsolescence is that when a patch is obsoleted, it is removed from the set of patches for a target product. But when a patch is superseded, it is removed from the set of patches for the target product if it has been superseded in each of its member families. If there is at least one patch family where the patch has not been superseded, the patch remains applied to the target product.

In an embodiment of the invention, when a patch has been superseded or obsoleted, the patch is no longer applied to the target product during installation. However, information about the patch remains present as part of product state/history store 112 for the product. This presents several advantages. First, even when superseded or obsolete, a patch is still registered as a patch of interest for the product. While the patch no longer falls into the set of applied patches, data about the patch may be retrieved from a database. Inventory and patch distribution tools may then use this data to correctly detect whether a patch for the product is desired. Second, if a patch is superseded or obsolete when applied to a particular product but conditions change such that the patch is no longer superseded or obsolete, the patch may be automatically reapplied to the product during the same transaction that changes the conditions. For example, if patch B supersedes patch A and is removed, patch A may automatically reapply to the product in the same product modification where patch B is removed. Third, if a patch is superseded or obsolete and then reapplied to the product, the product resources may remain at a correct state rather than being replaced with a version from the superseded or obsoleted patch. For instance, if patch B supersedes patch A and patch A is reapplied to a product, the product files may remain at a version provided by patch B.

In some cases, a patch already installed may supersede or obsolete a patch currently being applied to the target product for the first time. When installation engine 102 applies the new patch, it may mark the patch as superseded or obsolete without affecting the installed resources. Similarly, when a patch is superseded or obsolete, the patch may still be removed from the product. In this case, removing this patch does not affect the product because changes for the patch are not actually applied at the time of removal. However, the patch no longer exists on the machine, and an inventory of patches for the product will not include this patch.

Returning to 526 of FIG. 5, to remove superseded patches from the list of sequenced patches, sequencing engine 104 traverses the list in reverse order (i.e., sequencing engine 104 evaluates the last patch to be applied first). As sequencing engine 104 traverses the list, it maintains a set of patch family identifiers and their current sequence values (which initially start at 0). If a patch is a small update patch, sequencing engine 104 compares its patch family identifier to the list of current sequence values. If the current sequence values are greater than that of the small update patch for each patch family, sequencing engine 104 removes this patch from the list of patches to apply. If any patch family identifier of the patch is greater than the current sequence values, sequencing engine 104 maintains the patch in the list. Furthermore, if this patch is marked to supersede others in this particular patch family, the greater value becomes the new current sequence value. If the patch is a minor upgrade patch, sequencing engine 104 may update the current patch family identifiers but does not mark the minor upgrade patch as superseded.

At 528 of FIG. 5, new patch data resulting from updating the target product installed on the target machine is stored, for example, at patch state\history store 112. This new patch data may later be fetched for future patch installations. At 530, the process then exits.

APPENDIX A provides different scenarios on patch sequencing according to embodiments of the invention.

Figure 7:
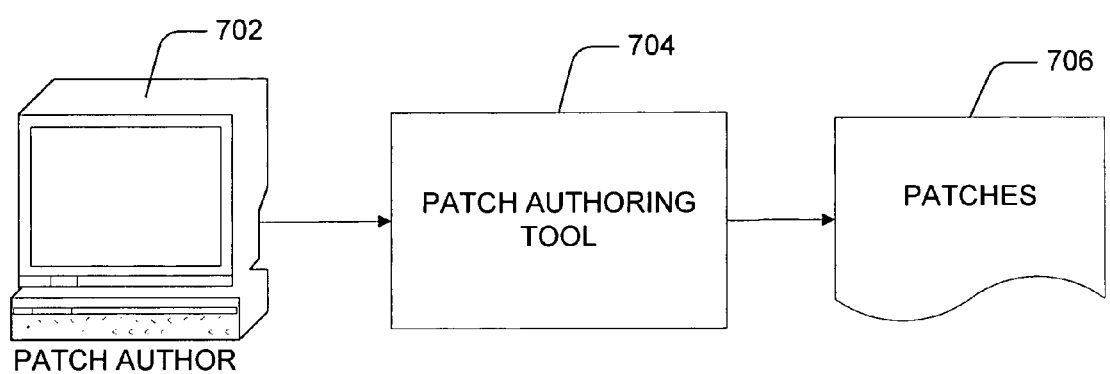
FIG. 7 is a block diagram illustrating an exemplary environment for authoring a patch according to one embodiment of the invention.

FIG. 7 illustrates an exemplary patch-authoring environment according to one embodiment of the invention. As shown, a patch author 702 may utilize a patch-authoring tool 704 to generate patches 706. In an embodiment of the invention, the patch-authoring tool 704 is configured to automatically generate patches 706 with sequencing data and without input from the patch author 702. Specifically, patch-authoring tool 704 may automatically generate patches 706 in a scenario where a single set of patches that are created in chronological order updates a single product. In this scenario, since patch-authoring tool 704 automatically generates sequencing data that applies to a single product, patch-authoring tool 704 may generate a PatchFamily value that is not globally unique. Accordingly, patch-authoring tool 704 may generate the PatchFamily value using a product code of the product. This automatic generation method places small update patches for a target product in a single patch family. However, patch-authoring tool 704 may not automatically set the PatchSequenceSupersedeEarlier attribute for the small update patches to allow for disjoint small update patches in the same product. Patch-authoring tool 704 may further automatically generate small update patches that target multiple minor upgrades for a single product.

To automatically generate a Sequence value for a particular patch, patch-authoring tool 704 utilizes the first three components of the Sequence format while allowing patch author 702 to use the fourth component to manually manipulate sequence orders in the future. Patch-authoring tool 704 uses the value "1" in the first component to indicate that this Sequence value is automatically generated. Patch-authoring tool 704 generates the Sequence value such that the chronological order in which patches are created defines the order in which installation engine 102 applies them to a particular target version. Therefore, patch-authoring tool 704 generates the second and third components of the Sequence value based on the date and time of patch creation. TABLE 5 illustrates how patch-authoring tool 704 generates the four components of a Sequence value.

TABLE 5

Components of an Automatically Generated Sequence Value

| Component | Minimum | Maximum | Description |
|---|---|---|---|
| 1 | 1 | 1 | 1 for an automatically generated Sequence value. |
| 2 | 0 | 65535 | Number of days since a given date (in coordinated universal time (UTC)). |
| 3 | 0 | 43200 | Number of seconds since midnight UTC divided by 2. |
| 4 | 0 | 0 | 0 for an automatically generated Sequence value. |

Patch-authoring tool 704 is also configured to inform patch author 702 if it fails to automatically generate patches 706. For example, patch-authoring tool 704 may inform patch author 702 that a patch includes multiple applicability rules such that each set is a minor upgrade that results in a different target version or that the patch is a mixture of small update, minor upgrade, and/or major upgrade patches. Patch-authoring tool 704 may also inform patch author 702 that a patch targets a set of multiple distinct products because patch-authoring tool 704 may not automatically generate correct patch sequences if future patches apply to a single product from this set of distinct products. In addition, patch-authoring tool 704 may inform patch author 702 that applicability rules for a small update patch do not restrict a target version.

Patch-authoring tool 704 may also automatically detect when a patch changes a product code or product version of a target product and populate the PatchProperty table to identify this patch as a major upgrade or minor upgrade patch. Patch-authoring tool 704 further allows patch author 702 to indicate that a particular small update patch has been included in an already-released minor upgrade patch and to provide a path to that minor upgrade patch. If patch author 702 provides this data, patch-authoring tool 704 creates a PatchFamily value that falls before the Sequence value of the minor upgrade patch's supersedence list. This allows the minor upgrade patch to supersede the small update patch. If patch author 702 does not provide this data, patch-authoring tool 704 schedules the small update patch before the minor upgrade patch, but the minor upgrade patch does not supersede the small update patch.

In an alternative embodiment of the invention, patch author 702 may manually control sequencing data in patches 706. In particular, patch author may explicitly set sequencing data in a patch by creating a Sequencing table to generate the patch. Thus, patch author 702 may override the automatic generation of sequencing data and manually create the sequencing data. This Sequencing table may provide explicit values for various sequencing behaviors for patch-authoring tool 704 to generate the PatchSequence table associated with the patch. TABLE 6 provides an exemplary format of the Sequencing table according to one embodiment of the invention.

TABLE 6

Exemplary Format of the Sequencing Table

| Column Name | Nullable? | Key? | Type | Description |
|---|---|---|---|---|
| PatchFamily | No | Yes | Identifier | The PatchFamily value of this patch for this target. |
| Target | Yes | Yes | Text | A product code, a foreign key, or null. |
| Sequence | No | No | Version | The sequence number associated with this patch for this patch family. |
| Supersede | Yes | No | Integer | Indicates if this patch supersedes earlier small update patches in this patch family. |

The PatchFamily column of the Sequencing table includes an identifier that indicates one of the one or more patch families to which this patch belongs. Together with the Target value, the PatchFamily value defines a primary key for the Sequencing table. A patch that belongs to multiple patch families or has different sequencing behaviors based on the target product code has one row in the Sequencing table for each distinct patch family or sequencing behavior. Patch-authoring tool 704 uses this column to populate the PatchFamily column of the PatchSequence table associated with this patch.

Patch-authoring tool 704 uses the Target column of the Sequencing table to determine a target product code for the PatchFamily value. A null Target column indicates that this PatchFamily value applies to different target product codes. If the Target column includes a foreign key, patch-authoring tool 704 uses this foreign key to retrieve a product code for populating the ProductCode column in the PatchSequence table associated with the patch. If the Target column includes a GUID, then patch-authoring tool 704 uses this GUID to populate the Product Code column in the PatchSequence table associated with the patch.

Furthermore, patch-authoring tool 704 uses the value in the Sequence column of the Sequencing table to populate the Sequence column in the PatchSequence table. If the Sequence column of the Sequencing table is null, then patch-authoring tool 704 automatically generates a Sequence value for this patch. Patch-authoring tool 704 also uses the value in the Supersede column of the Sequencing table to populate the Attributes column of the PatchSequence table (e.g., by setting the PatchSequenceSupersedeEarlier attribute). A non-null Supersede column indicates that this patch supersedes earlier small update patches in this patch family.

Figure 8:
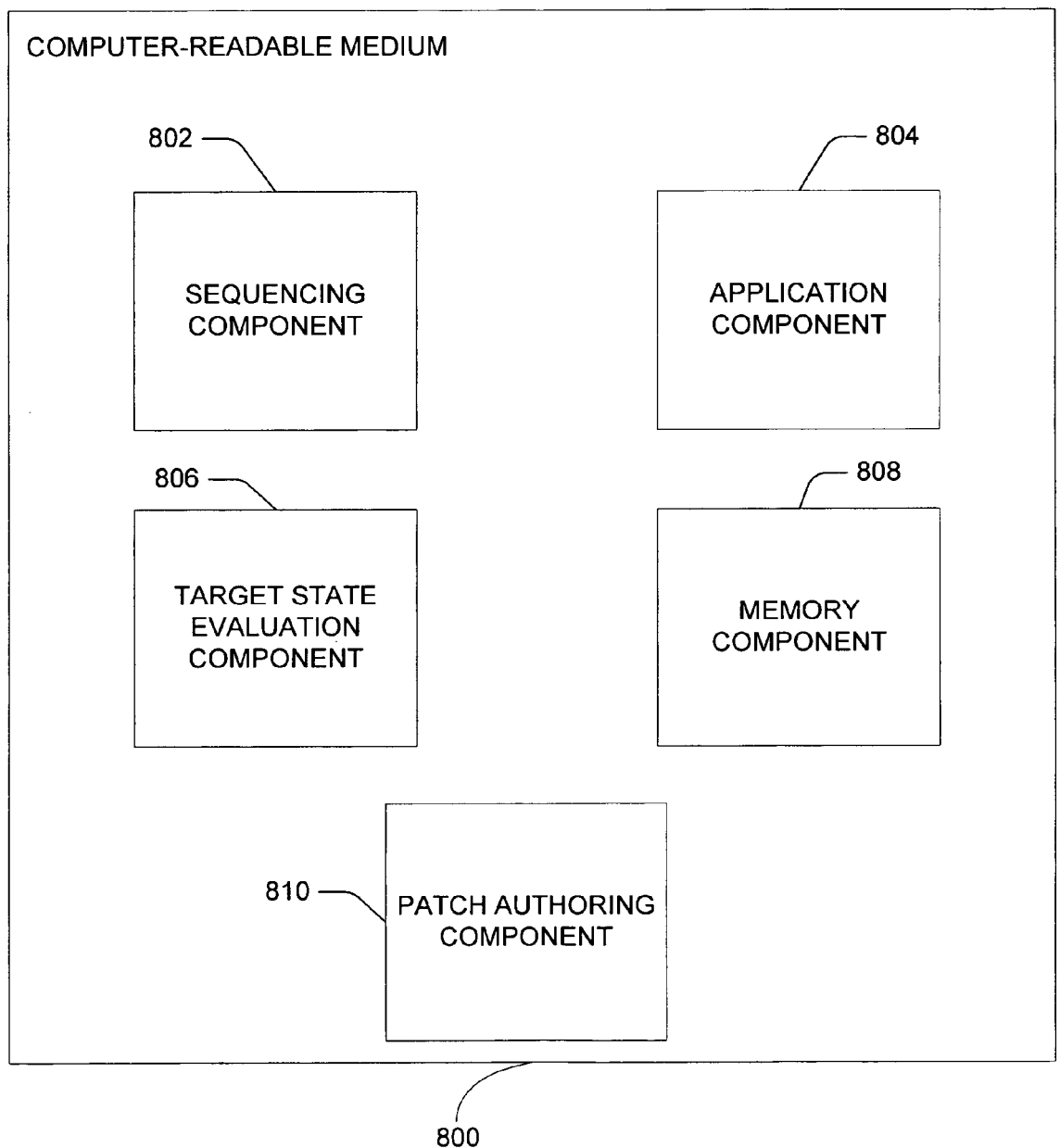
FIG. 8 is a block diagram illustrating another exemplary computer-readable medium according to one embodiment of the invention.

FIG. 8 is a block diagram illustrating an exemplary computer-readable medium 800 according to one embodiment of the invention. As shown, the computer-readable medium 800 includes a sequencing component 802, an application component 804, a target state evaluation component 806, a memory component 808, and a patch authoring component 810. However, it is contemplated that computer-readable medium 800 may be any quantity of computer readable media and may comprise various combinations of components and functionalities associated with each component.

The sequencing component 802 is configured to receive sequencing data of each of a plurality of patches (e.g., a plurality of small update patches) from a user. The sequencing data indicates a portion (e.g., patch family) of a software product that the patch is a member of and a relative ordering between the patch and other members of the same portion. Sequencing component 802 also determines a logical order of application for the plurality of patches based on the received sequencing data. Sequencing component 802 may also receive sequencing data of one or more patches already applied to the software product and determine the logical order of application by determining a logical sequence among the plurality of patches and the patches already applied to the software product based on the received sequencing data. The application component 804 then executes the plurality of patches on the software product in accordance with the determined logical order of application.

The sequencing data may also include supersedence information regarding each of the plurality of patches. Sequencing component 802 may then identify a superseded patch in the plurality of patches based on the received sequencing data and remove the superseded patch from the determined logical order of application.

In an embodiment of the invention, sequencing component 802 is configured to determine the logical order of application by first determining a version of the software product that the plurality of patches targets for updating the software product. Sequencing component 804 then identifies a target portion of the software product for the determined version. In response, sequencing component 802 determines which one or more patches of the plurality of patches are members of the identified target portion based on the received sequencing data. Sequencing component 802 then sorts the patches that are members of the identified target portion according to the relative ordering indicated in the received sequencing data (e.g., via a frontier-traversal algorithm).

To determine one or more versions of the software product that the plurality of patches targets, sequencing component 802 creates a sorted list of patches including a major upgrade patch and/or minor upgrade patch that has already been applied to the software product or that is being applied to the software product. Sequencing component 802 then removes obsoleted patches from the created sorted list and assigns each of the plurality of patches to one or more versions of the software product determined based on the sorted list without the obsoleted patches.

The target state evaluation component 806 is configured to determine a desired state of the software product based on the determined logical order of application. Application component 804 then determines a current state of the software product and executes the plurality of patches on the software product as a function of the determined current state of the software product and the determined desired state of the software product. Application component 804 may also determine a new state of the software product in response to executing the plurality of patches on the software product, and the memory component 808 then stores the determined new state of the software product.

The authoring component 810 is configured to automatically generate the sequencing data for each of the plurality of patches if the plurality of patches targets a single portion to update the software product. For example, authoring component 810 may automatically generate the sequencing data for each of the plurality of patches by associating each of the plurality of patches with a product code of the software product and assigning a relative order for each of the plurality of patches based on a date and time that each patch is created.

Figure 9:
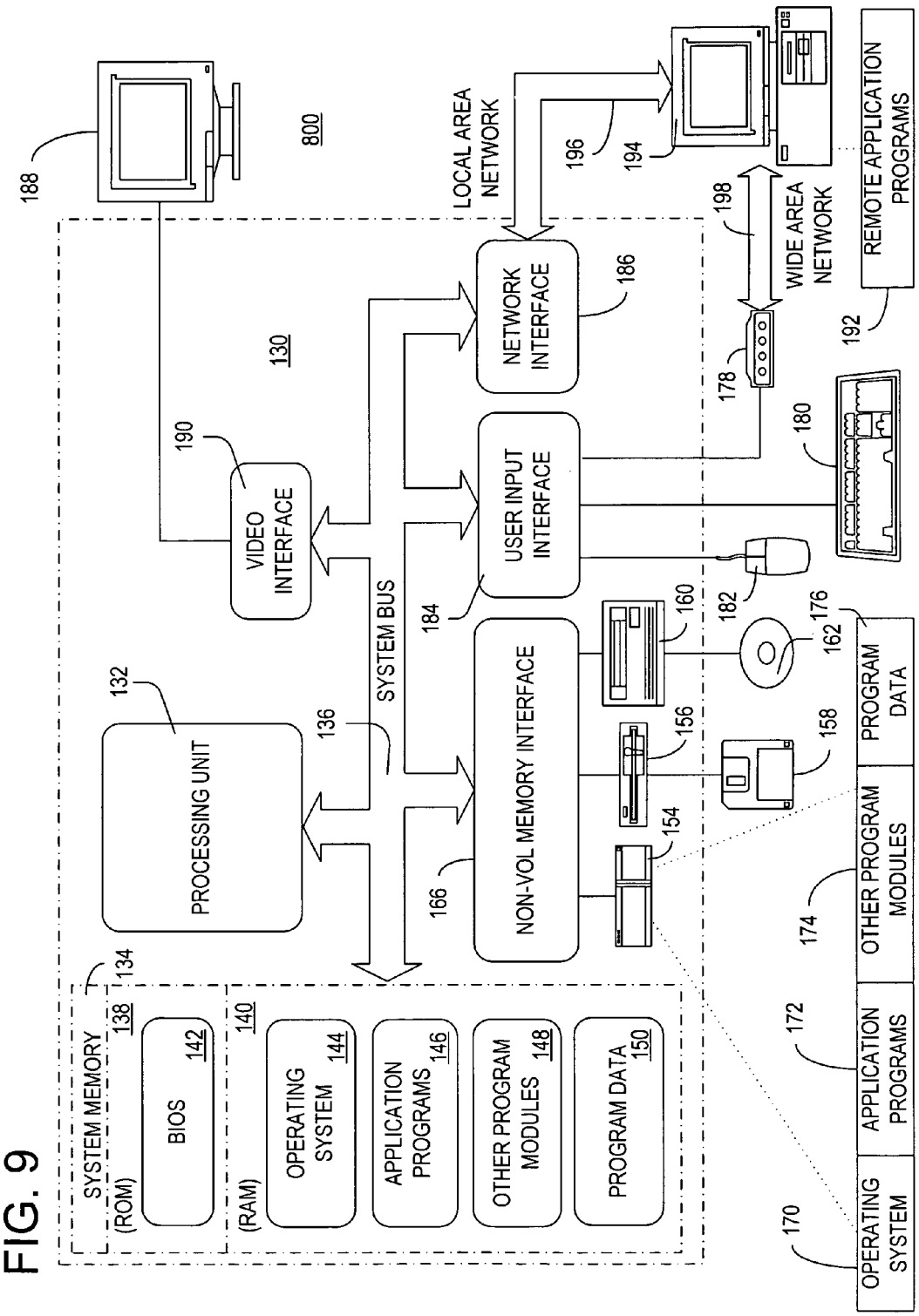
FIG. 9 is a block diagram illustrating an exemplary embodiment of a suitable computing system environment in which one embodiment of the invention may be implemented.

FIG. 9 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 9 illustrates operating system 144, application programs 146, other program modules 148, and program data 150.

The computer 130 may also include other removable/non-removable, volatile/nonvolatile computer storage media. For example, FIG. 9 illustrates a hard disk drive 154 that reads from or writes to non-removable, nonvolatile magnetic media. FIG. 9 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 9, provide storage of computer readable instructions, data structures, program modules and other data for the computer 130. In FIG. 9, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 9 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 9 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to update a software product by a plurality of patches. Computer-executable instructions are configured to receive sequencing data of each patch of the plurality of patches from a user. Each patch of the plurality of patches has a defined membership in a portion of the software product and has a defined order in the portion relative to one or more other patches that are members of the portion. The sequencing data indicates a portion of the software product of which the patch is a member of a relative ordering between the patch and one or more other members of the portion. Computer-executable instructions are also configured to determine a logical order of application for the plurality of patches based on the received sequencing data. Computer-executable instructions are further configured to apply the plurality of patches to the software product according to the determined logical order of application.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

APPENDIX A

APPENDIX A provides different scenarios on patch sequencing according to embodiments of the invention.

Creating Small Update Patches

Small update patches do not change a product code or product version and usually update a small number of files in a product to fix a single problem. To release a first small update patch for the product, a patch author chooses a string as an identifier for the patch's patch family. This string assists a sequencing engine to determine the relative sequencing of future patches that may similarly update the product. For the first small update patch, the patch author may use any sequence number. For example, the patch author may use a combination of the product's major version, minor version, or a number derived from the current date. The patch author may also start with the sequence number 1.0.0.0 (or another obvious starting point) for the first small update patch. A patch-authoring tool may also automatically generate the sequence number based on a combination of the product's version and the date and time when the patch is created. For this example, since this small update patch does not supersede another patch, the attribute of this patch is 0. The PatchSequence table associated with this first patch thus is:

| PatchFamily | ProductCode | Sequence | Attributes |
|---|---|---|---|
| My_Product | | 1.0.1.0 | 0 |

When releasing a second small update patch, this second patch belongs to the same patch family as the first small update patch if the patch author follows the "one-product, one family" model. If the patch author does not follow the "one-product, one family" model, the second small update patch still belongs to the same patch family as the first small update patch because it modifies the same file as the previous update. If the second small update patch logically follows the first small update patch, it may be desirable to assign a greater sequence number for the second small update patch than that of the first small update patch. Again, since this small update patch does not supersede another patch, the attribute of this patch is 0. The PatchSequence table associated with this second patch thus is:

| PatchFamily | ProductCode | Sequence | Attributes |
|---|---|---|---|
| My_Product | | 1.0.2.0 | 0 |

Figure 10A:
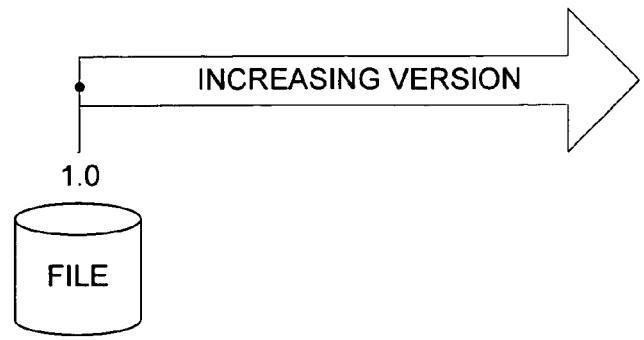
FIGS. 10A-10D are block diagrams illustrating sequencing and applying multiple small update patches to a target product according to one embodiment of the invention.
Figure 10B:
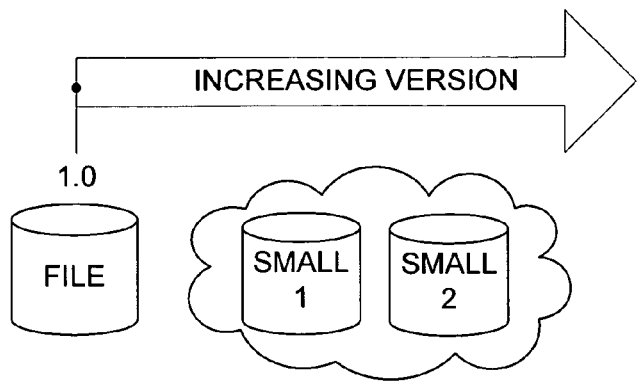

Before an installation engine applies the first and second small update patches to the target product, a sequencing engine of the installation engine orders the patches. The sequencing engine generally follows a seven-step process to order the patches. First, corresponding to 504 and 506 of FIG. 5, the sequencing engine creates a framework of ProductVersion values. In this example, since there is not a minor upgrade patch to evaluate, the framework of ProductVersion values includes a single ProductVersion, as illustrated in FIG. 10A. Second, corresponding to 508 of FIG. 5, the sequencing engine groups the patches by ProductVersion. The lack of minor upgrade patches means that there is one group for the first and second small update patches. This group of patches targets the single ProductVersion value in the file. The sequencing engine examines each small update patch to verify that it targets the correct ProductVersion value. In this example, the two small update patches both target the correct ProductVersion and are thus included in the group, as illustrated in FIG. 10B.

Figure 10C:
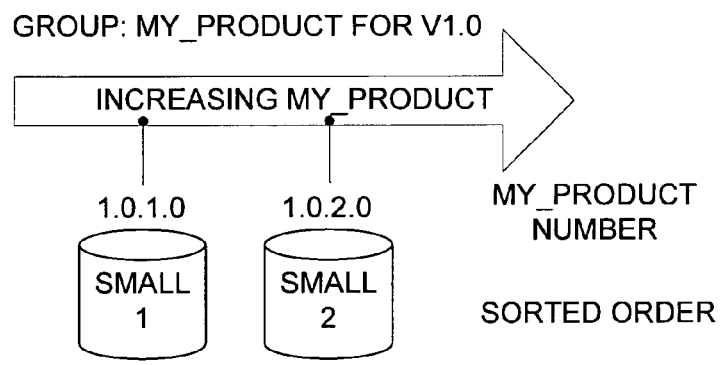

Third, corresponding to 512 of FIG. 5, the sequencing engine groups the patches by patch family within each ProductVersion. In this example, since the two small update patches belong to a single patch family (i.e., the My_Product family), the sequencing engine does not consider an additional grouping. Fourth, corresponding to 516 of FIG. 5, the sequencing engine sorts patches within each patch family. The sequencing engine sorts each patch family based on the Sequence value from the PatchSequence table of each small update patch. In this example, there is a single patch family to sort (i.e., the My_Product family for the 1.0 ProductVersion), and the second small update patch follows the first small update patch in this patch family, as illustrated in FIG. 10C. Fifth, corresponding to 520 of FIG. 5, the sequencing engine combines patch families in each ProductVersion. In the example, since the patches for this product belong to a single patch family, the sequencing engine does not combine patch families in each ProductVersion.

Figure 10D:
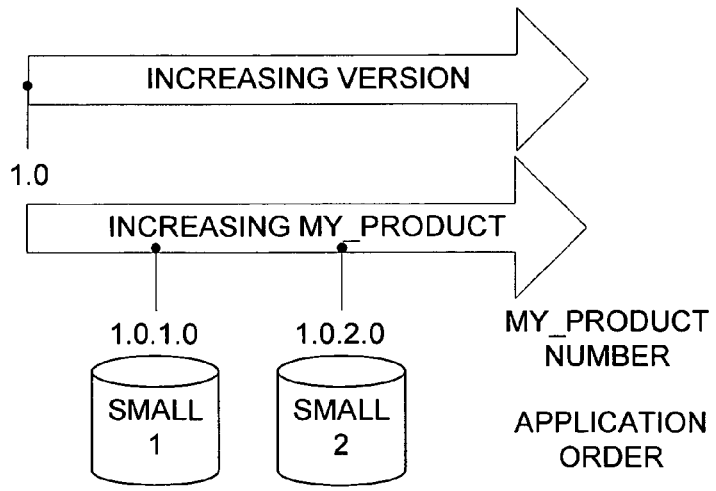

Sixth, corresponding to 524 of FIG. 5, the sequencing engine combines ProductVersion groups. In particular, the sequencing engine combines the sorted patch families for each ProductVersion value with minor upgrade patches to create a single list of ordered patches that apply to the product. In the example, since there is one ProductVersion group for this product, the sequencing engine does not take an action in this step, as illustrated in FIG. 10D. Finally, corresponding to 526 of FIG. 5, the sequencing engine eliminates superseded patches from the single list of ordered patches. In this example, there are no superseded patches. Therefore, the calculated patch order remains unchanged.

Releasing a Minor Upgrade Patch

Some products periodically release updates that significantly change the products. Such updates may include a collection of earlier fixes, new fixes, new functionality, or a combination of the above. A patch author generally may include such updates in minor upgrade patches that change a product's version but not the product's code. This also provides a good known product state for targeting by future patches. Continuing the previous example, the patch author releases a first minor upgrade patch (Minor 1) that includes new updates as well as updates previously released as small update patches. Since the first minor upgrade patch updates the same files previously updated by the small update patches, it is a member of the same patch family as the earlier small update patches. The version of the file in the first minor upgrade patch includes the updates previously released as small update patches to the product, therefore the sequence number for the PatchSequence table of the first minor upgrade patch is greater than or equal to the highest earlier sequence number (1.0.2.0). Since the file in this minor upgrade patch also includes other updates that have not been released before and has a higher file version than the last small update patch, the sequence number for this minor upgrade patch is desired to be greater than the highest earlier sequence number. In this example, the sequence number of the minor upgrade patch (1.1.0.0) reflects the new ProductVersion value. The first minor upgrade patch includes the PatchSequenceSupersedeEarlier attribute because this minor upgrade patch includes the updates from earlier small update patches. The PatchSequence table associated with this minor upgrade patch thus is:

| PatchFamily | ProductCode | Sequence | Attributes |
|---|---|---|---|
| My_Product | | 1.1.0.0 | 1 |

The patch author thereafter releases a third small update patch. The patch-authoring tool populates the PatchSequence table for the third small update patch using logic similar to that of the first two small update patches. However, one difference is that the third small update patch targets version 1.1 of the product, which is the version that results from the application of the first minor upgrade patch. The PatchSequence table associated with this third small update patch thus is:

| PatchFamily | ProductCode | Sequence | Attributes |
|---|---|---|---|
| My_Product | | 1.1.3.0 | 0 |

Before the installation engine applies these patches to the target product, the sequencing engine orders these patches. Again, the sequencing engine follows the seven-step process.

Figure 11A:
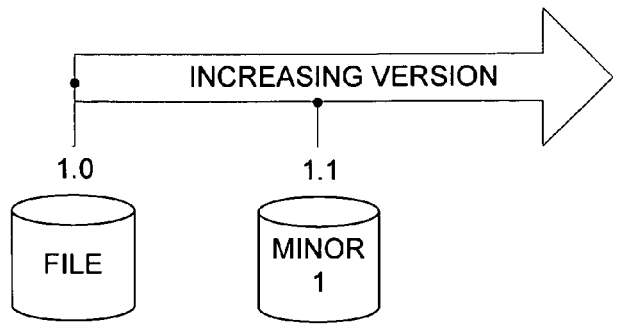
FIGS. 11A-11E are block diagrams illustrating sequencing and applying a minor upgrade patch and a small update patch to a target product according to one embodiment of the invention.
Figure 11B:
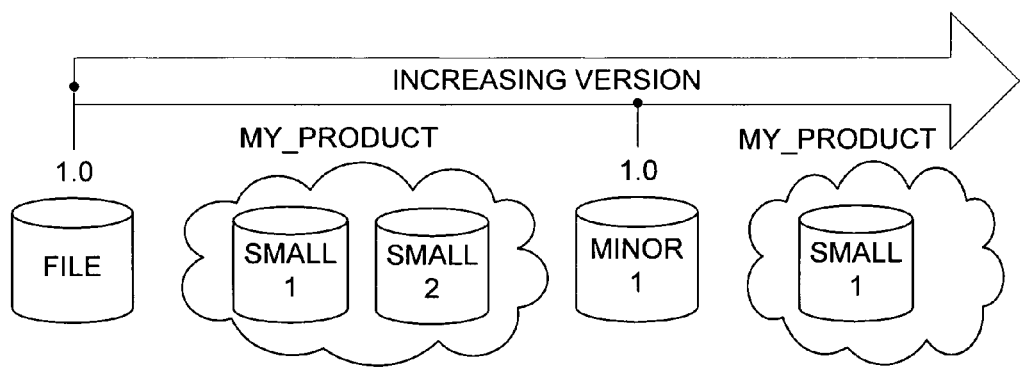

First, corresponding to 504 and 506 of FIG. 5, the sequencing engine creates a framework of ProductVersion values. In this example, there is a minor upgrade patch. Therefore, the ProductVersion framework includes two ProductVersion values. The original file reflects version 1.0 of the product, whereas the first minor upgrade patch creates version 1.1 of the product, as illustrated in FIG. 11A. Second, corresponding to 508 of FIG. 5, the sequencing engine groups patches by ProductVersion. In the example, there are two versions of the product to evaluate. The first two small update patches target version 1.0 of the product. The third small update patch targets version 1.1 (created by the potential application of the first minor upgrade patch) of the product, as illustrated in FIG. 11B. Third, corresponding to 512 of FIG. 5, the sequencing engine groups patches by patch family within each ProductVersion. In this example, since these patches belong to a single family (the My_Product family), the sequencing engine does not consider an additional grouping.

Figure 11C:
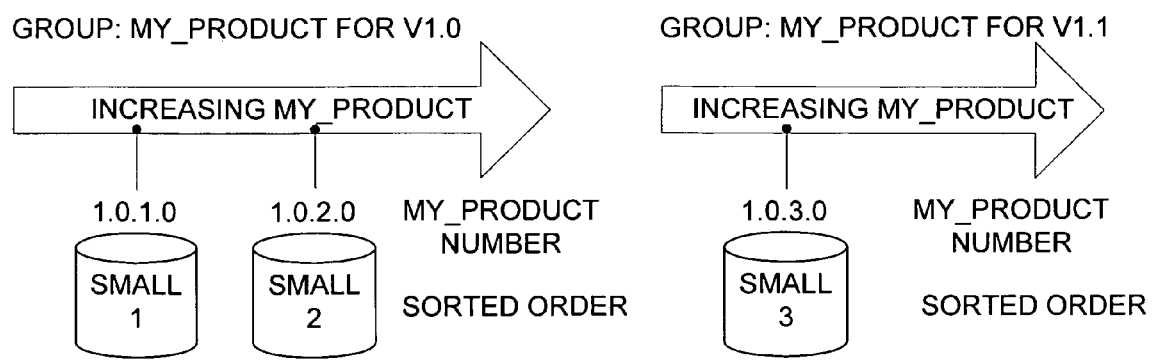

Fourth, corresponding to 516 of FIG. 5, the sequencing engine sorts patches within each patch family. The sequencing engine sorts each patch family based on the Sequence value from the PatchSequence table of each patch. In this example, there are two groups—the My_Product family group for version 1.0 (including the first and second small update patches) and the My_Product family group for version 1.1 (including the third small update patch). As illustrated in FIG. 11C, the sequencing engine sorts each patch family independently, resulting in an ordering of the first small update patch followed by the second small update patch. The sequencing engine does not sort the My_Product family group for version 1.1 because it includes a single small update patch. At this point, the third small update patch is not related to the other two small update patches because they target different versions of the product. Fifth, corresponding to 520 of FIG. 5, the sequencing engine combines patch families in each ProductVersion. In the example, since the patches for this product belong to a single patch family, the sequencing engine does not combine patch families in each ProductVersion.

Figure 11D:
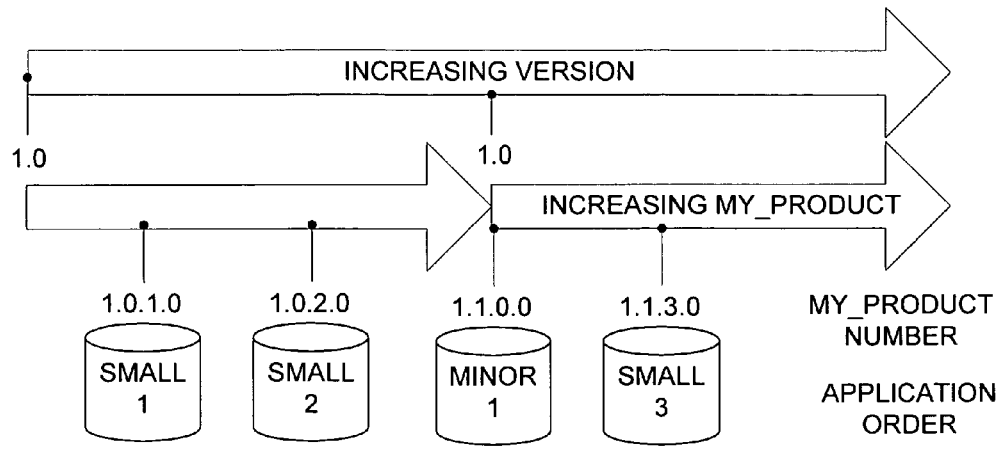
Figure 11E:
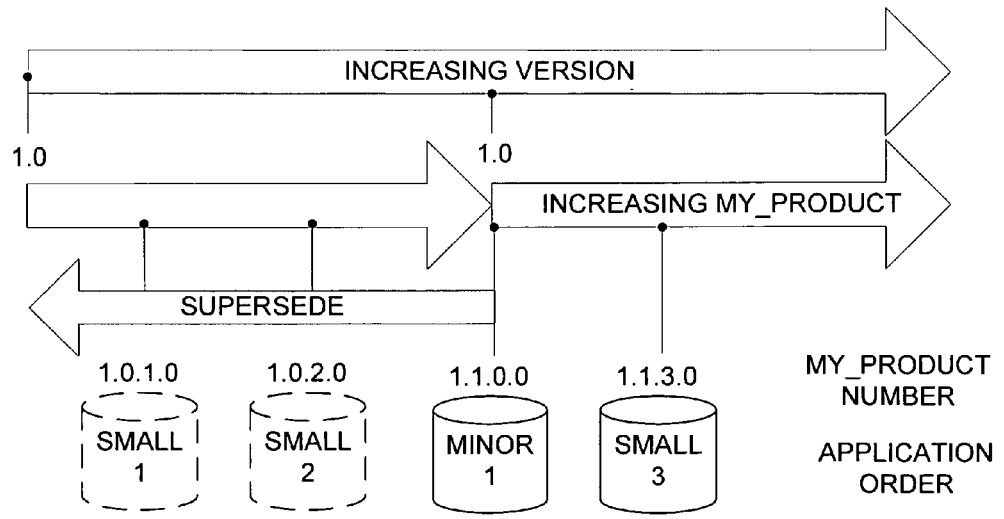

Sixth, corresponding to 524 of FIG. 5, the sequencing engine combines ProductVersion groups. Specifically, the sequencing engine combines the sorted family groups for each ProductVersion with the minor upgrade patch to create a single list of ordered patches that apply to the product. As illustrated in FIG. 11D, the sequencing engine combines the two groups by placing the My_Product family group for version 1.0 first in the patch order. Next, the sequencing engine appends the first minor upgrade patch to the patch order, which transforms the product to version 1.1. Then, the sequencing engine appends the My_Product family group for version 1.1 to the patch order. Seventh, corresponding to 526 of FIG. 5, the sequencing engine eliminates superseded patches from the patch order. In this example, the first minor upgrade patch indicates that it supersedes earlier patches ordered below the sequence number 1.1.0.0 in the My_Product family. Since the first and second small update patches have lower sequence numbers, the sequencing engine eliminates these patches from the patch application order, as illustrated in FIG. 11E. Even though the installation engine does not apply these two patches to the product, it saves their information in case they later become desirable.

Backporting an Existing Fix

Figure 12:
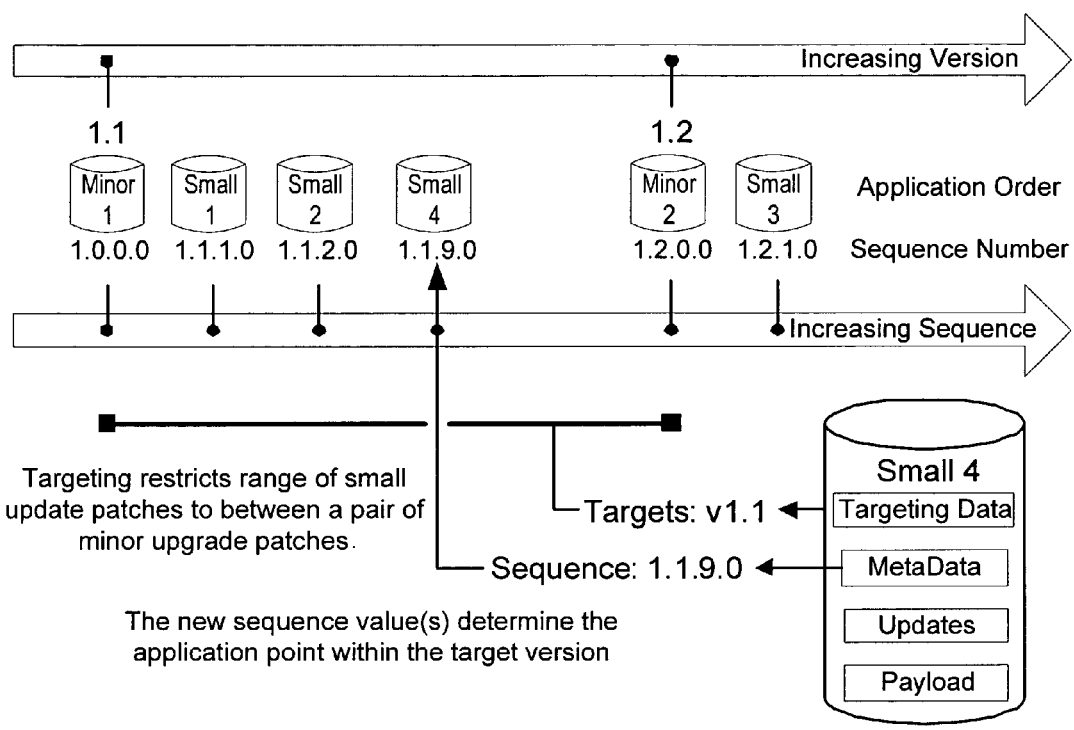
FIG. 12 is a block diagram illustrating a patch for back-porting a fix included in a later product version according to one embodiment of the invention.

In contrast to the scenario where a new patch targets both the current version of a product and older versions of the product, a small update patch for a fix backported from a later version recognizes that it does not apply whenever the product reaches a state where the fix already exists. To create such a small update patch, a patch author selects a sequence number that falls in the range between the lowest version targeted by the small update patch and the first patch that incorporates the fix, as illustrated in FIG. 12.

The use of an appropriate sequence number allows both a correct supersedence relationship between this small update patch and other patches and an ability to sequence this small update patch with respect to other small update patches that apply to the same target version. If the PatchSequence table associated with the minor upgrade patch does not include the PatchSequenceSupersedeEarlier attribute, this small update patch still applies to the target product.

Multi-Target Patches

A multi-target patch is a patch that targets multiple versions of a product or targets multiple stock-keeping units (SKUs) of a product.

During the lifetime of a product, a patch author may release a fix to update several version of the product. While it is possible to create multiple patches with the same fix (each targeting a single product version), there are several disadvantages to this approach. For example, a customer who applies a version-specific patch to the product and then upgrades the product to a later version that also desires the patch may lose the fix because the existing single-version patch no longer applies to the product. Thus, upgrading the product actually caused to original problem to reappear.

A solution is to create a single patch that targets several versions of the product. When the customer applies the fix to one version and then upgrades the product to another version, the existing patch shifts its position in the sequence to target the correct version of the product. This behavior remains even if the customer uninstalls a minor upgrade patch causing the product to switch to a lower version. As long as the patch supports the "new" version of the product (whether lower or higher), the small update patch will shift to target the correct version.

Figure 13:
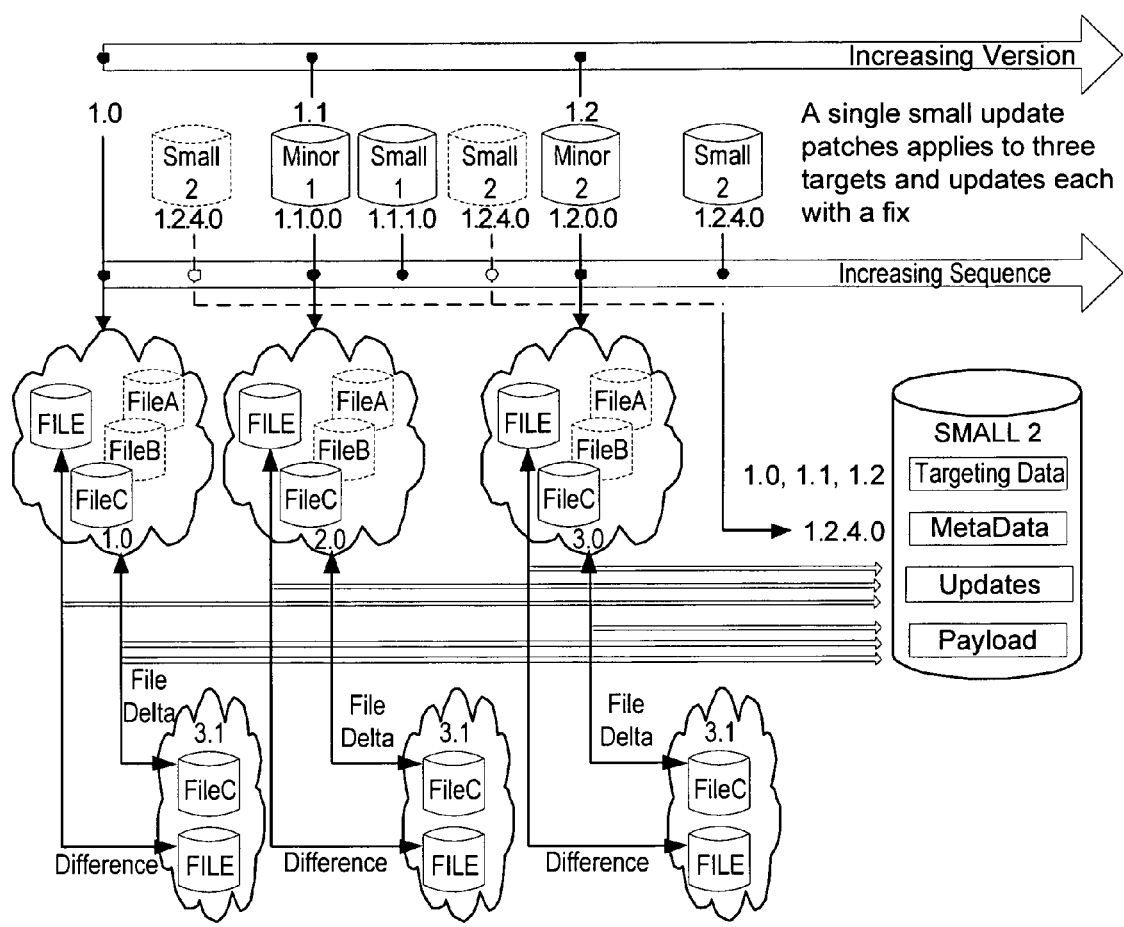
FIG. 13 is a block diagram illustrating a patch with multiple target images and updated images based on product versions according to one embodiment of the invention.
Figure 14:
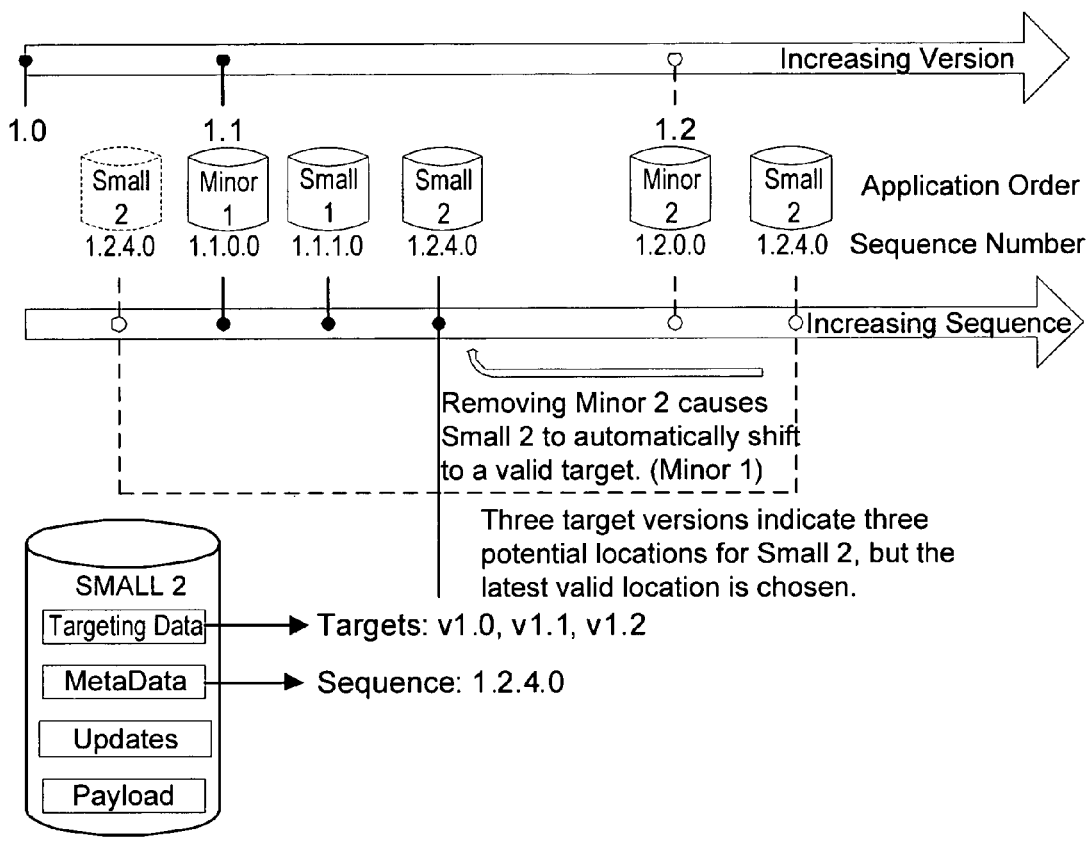
FIG. 14 is a block diagram illustrating removal of a minor upgrade patch to trigger a small update patch retarget according to one embodiment of the invention.

For example, FIG. 13 illustrates a product P that has two possible minor upgrade patches: Minor 1 and Minor 2. When a patch author releases a fix for the three versions (i.e., the original version, Minor 1, and Minor 2), he or she may release a multi-target patch that keeps a customer updated regardless of which product version is installed on the machine. The patch author creates the patch with a sequence number in an appropriate patch family that is greater than any current sequence number for the patch family. When the installation engine applies the patch, it examines the versions listed as targets of the patch and applies the patch at the highest possible target version. Because the sequence number is higher than any existing patch, none of the existing minor upgrade patches supersedes this patch. As illustrated in FIG. 14, when the customer uninstalls a minor upgrade patch (e.g., Minor 2), the small update patch uses the multi-version targeting of the patch and locates another version of the product where the patch may apply. In this example, the small update patch targets the Minor 1 version of the product such that the file remains up-to-date.

If a backported fix targets multiple older version of a product, the patch combines sequencing behaviors of a backported fix and a multi-target patch. The patch author may select an appropriate sequence number for the small update patch. For example, if a fix in a fourth minor upgrade patch of a product is backported as a small update patch to a third minor upgrade patch and a second minor upgrade patch, then the sequence number for the small update patch is greater than the second and third minor upgrade patches' sequence numbers in the appropriate family but less than the fourth minor upgrade patch's sequence number. In this case, the small update patch shifts between targeting the second minor upgrade patch and the third minor upgrade patch as long as those versions exist on the machine. But when the installation engine installs the fourth minor upgrade patch, the small update patch becomes inactive. If the fourth minor upgrade patch is subsequently uninstalled, the small update patch applies to the product again.

The other scenario for using a multi-target patch is when a single patch targets the same version of multiple SKUs of a product. For example, the product may ship in an Enterprise version, a Developer Version, and a Trial Version. Because a single patch may target any of the product files, when defining patch family identifiers for the set of products, it may be desirable to consider the set of products that may be updated by a single patch and to avoid duplication of identifiers across the products. If a particular functionality is implemented in a similar manner across multiple SKUs of the product such that a single patch may update this functionality, using the same patch family identifier in patches that individually target the SKUs may be appropriate. However, it may be desirable to avoid using the same patch family identifier for unrelated functionalities, which may result in incorrect patch sequence dependencies. For example, it may be undesirable to have a ProductCore family in the Enterprise version and a ProductCore family in the Developer version unless the core functionality of the products is similar enough that a single patch may update both (even if such a patch does not exist currently).

For example, a set of products P, Q, and R are different products in the same general product family. Each product has had patches released for its unique features, but a patch author now releases a patch to fix a problem in a shared resource common to these products. While individual patches may target each product, the patch author may create a single multi-target patch that keeps a customer up-to-date regardless of which product is installed on the customer's machine. When applied to one of the target products, the sequencing engine sequences the multi-target patch based on that target product. If multiple target products are installed on the same machine, the multi-target patch may apply to each, and the sequencing engine sequences this patch independently for each target product.

Multi-Family Patches

It is possible to place a patch in multiple patch families by placing multiple rows in the associated PatchSequence table. There are several cases where a patch may belong to more than one patch family. For example, the patch includes updates to parts of a product defined by different families because the fix does not function without a related fix included in a component belonging to a different family. In another example, the patch may consolidate functionality updates provided independently in several earlier patches. Furthermore, the patch may update the same functionality of two or more products that were previously updated by distinct patches having different patch family values.

Figure 15:
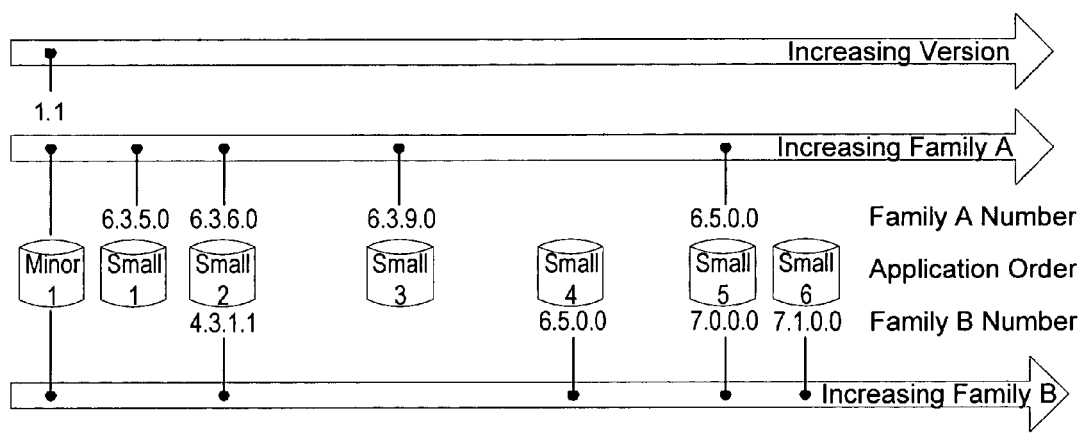
FIG. 15 is a block diagram illustrating consolidating sequences across multiple patch families according to one embodiment of the invention.

When sequencing a set of patches that involve multiple patch families, the sequencing engine calculates a single unified sequence that satisfies the various patch families. Specifically, the sequencing engine first calculates the sequence for each family independently. The sequencing engine then finds points of intersection in the various families. FIG. 15 illustrates a set of patches for a product that belongs to two different families, with three patches (Minor 1, Small 2, and Small 5) belonging to both families. When the sequencing engine evaluates the families, Small 1, Small 2, Small 3, and Small 5 apply in that order within Family A. Similarly, Small 2, Small 4, Small 5, and Small 6 apply in that order for Family B. When the installation engine applies the two families to the product together, the sequencing engine calculates a unified order —Small 1, Small 2, Small 3, Small 4, Small 5, and Small 6.

In the example illustrated in FIG. 15, patches in independent families do not have ordering restrictions relative to each other and thus may apply in any order. Thus, the installation engine may apply Small 3 before or after Small 4 if other patches apply to the correct product version.

Figure 16:
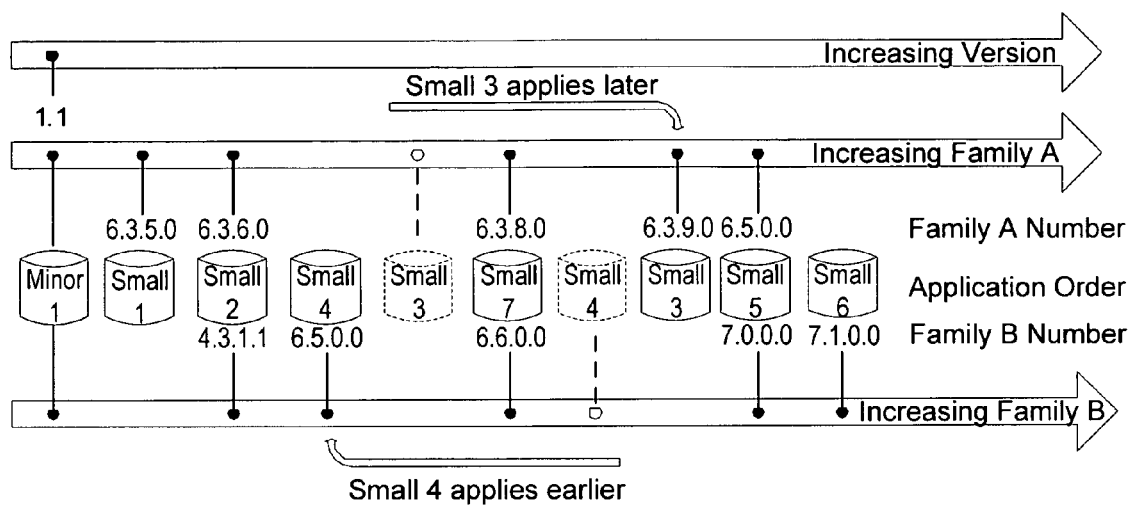
FIG. 16 is a block diagram illustrating adding a new patch to change an application order for existing patches according to one embodiment of the invention.

Referring to FIG. 16, if the installation engine applies a new patch Small 7 to the product with sequencing restrictions indicating that it comes after Small 4 but before Small 3, then the order of application for Small 3 and Small 4 may change. If Small 3 and Small 4 are independent of each other (e.g., as indicated by their lack of a common patch family), then this change in application order is transparent to the product. If there is a dependency in the order of application between Small 3 and Small 4, then the patches have at least one patch family in common, and that common patch family defines the relationship between the two patches.

Figure 17:
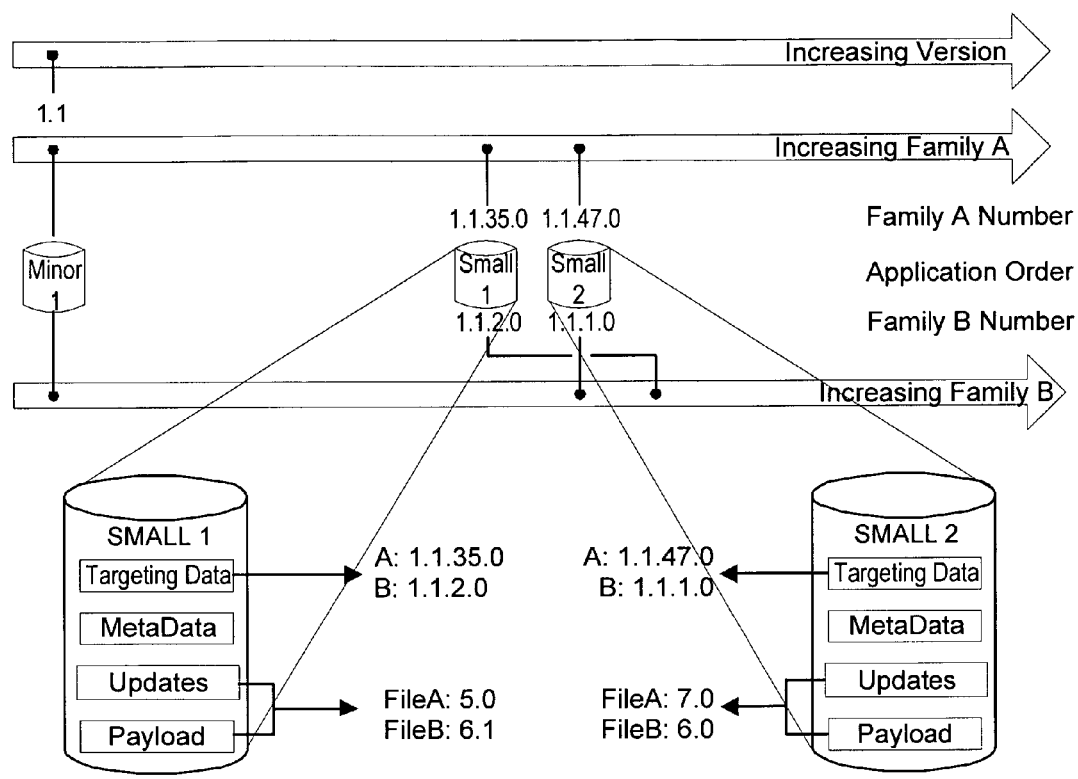
FIG. 17 is a block diagram illustrating multi-family patches with no valid sequence due to a dependency cycle according to one embodiment of the invention.

There are certain situations where it may not be possible to define a single patch sequence that satisfies different patch families. Such situations may arise, for example, when two distinct teams, who are each responsible for patching their own feature of the same product, simultaneously release an update that incorporates an earlier version of each other's work. FIG. 17 illustrates a scenario where two patch families provide contradictory instructions for a pair of patches. In Family A, Small 1 indicates that it applies to a product before Small 2, whereas in Family B, Small 2 indicates that is applies to the product before Small 1. There is not a valid sequence that meets both conditions. When the sequencing engine encounters a set of patches with sequencing restrictions that it cannot meet, the patch application operation fails.

Figure 18:
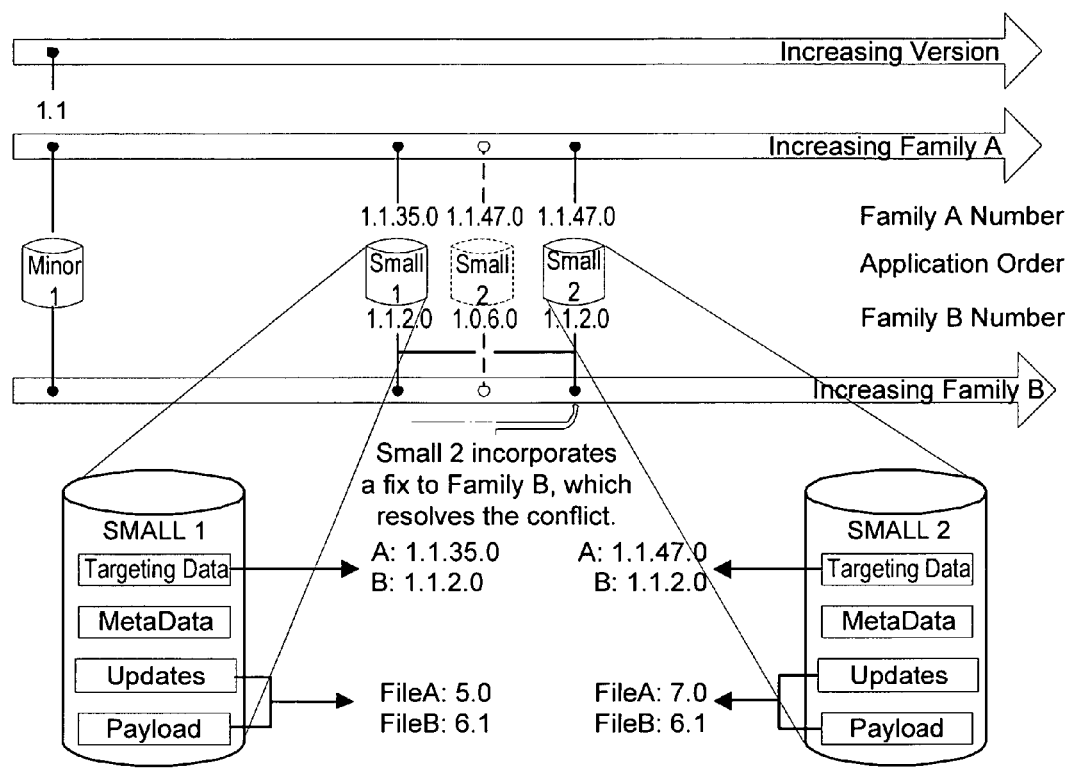
FIG. 18 is a block diagram illustrating an updated patch scenario with no dependency cycle according to one embodiment of the invention.

If the sequencing engine encounters a contradictory scenario, sometimes one of the family sequences may be in error, and the sequencing engine may return a failure in this scenario. Alternatively, the sequencing engine may solve the problem by examining the underlying product updates and correcting a sequence value. However, if both family sequences are correct, then sequencing engine may arbitrarily choose one patch as the later patch. As illustrated in FIG. 18, this arbitrarily chosen "later" patch may be updated to include the latest versions of the functionality described by Family A and Family B, and the metadata for the patch may be updated to include sequence values that reflect this new relationship. Updating the sequence value to resolve the sequencing ambiguity without updating the actual contents of the patch to include the latest versions of the resources may result in an incorrect result when the installation engine applies both patches, since the installation engine does not know that the lower version in the last patch is incorrect.

Figure 19:
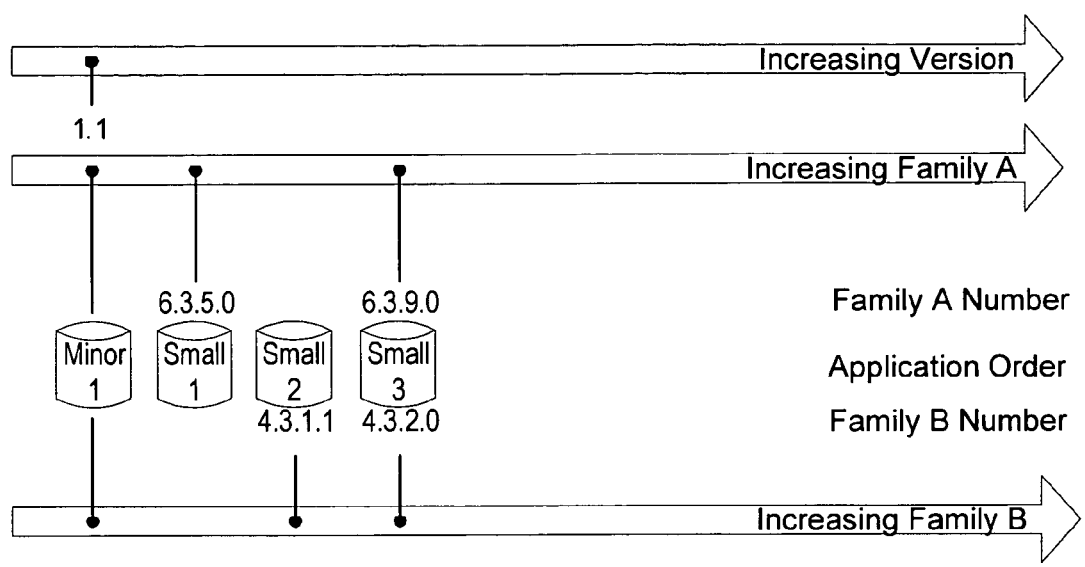
FIG. 19 is a block diagram illustrating a multi-family supersedence scenario according to one embodiment of the invention.

When working with multiple families in a patch, supersedence logic applies on a per-family basis. If a patch is a member of two families, the patch is superseded in both families before it is removed from the set of patches applied to a product. For example, in the example illustrated in FIG. 19, the installation engine applies two small update patches (Small 1 and Small 2) to a product in two different families (Family A and Family B). These two small update patches are followed by a third small update patch (Small 3) that includes the functionality of both earlier small update patches and is thus a member of both Family A and Family B.

Figure 20:
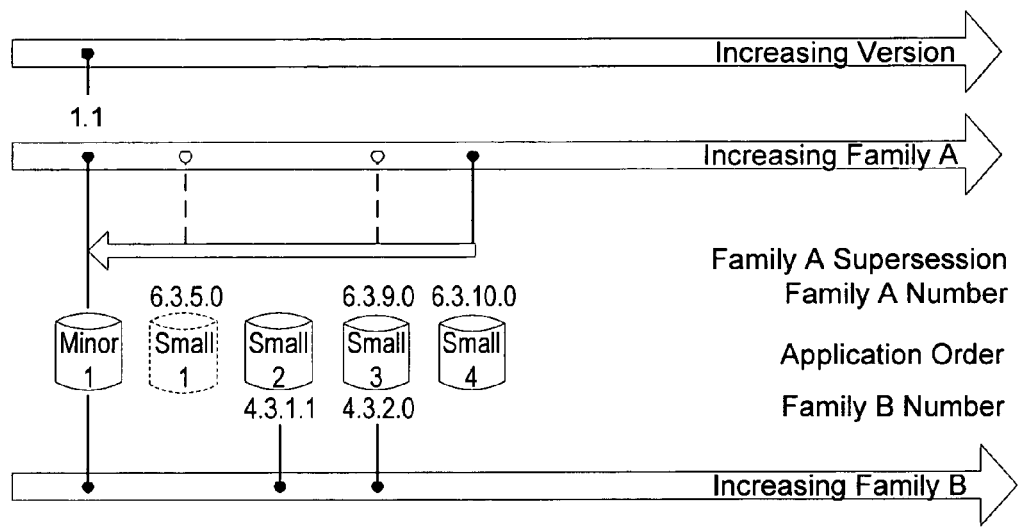
FIG. 20 is a block diagram illustrating a patch that is superseded in one patch family but not in other patch families according to one embodiment of the invention.
Figure 21:
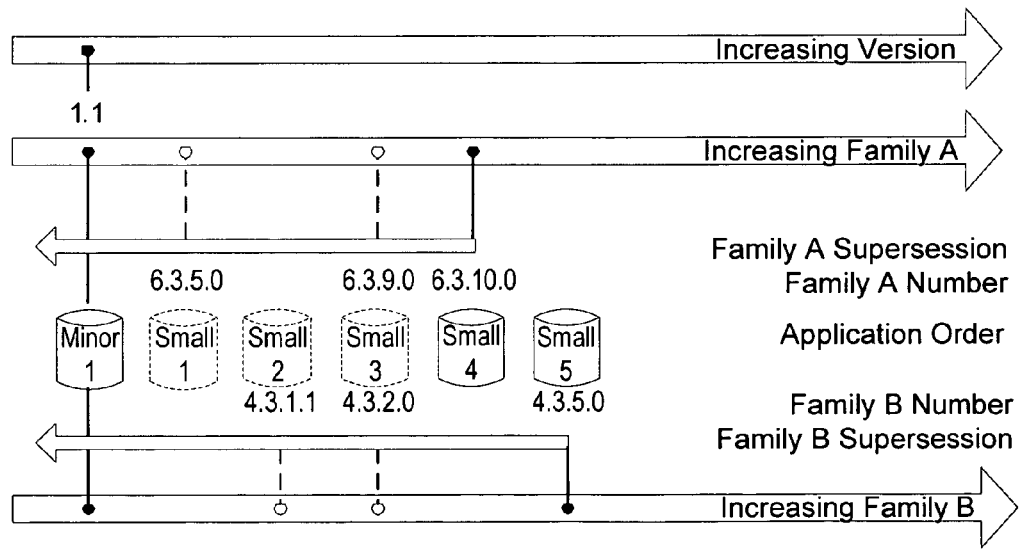
FIG. 21 is a block diagram illustrating a multi-family patch that is superseded in various patch families according to one embodiment of the invention.

As illustrated in FIG. 20, when the installation engine applies a fourth small update patch (Small 4) that is a member of Family A and supersedes patches in that family, Small 1 no longer directly applies to the product. However, Small 3, which is a member of both Family A and Family B, still applies to the product because there is not a patch that supersedes Small 3 in Family B. Further illustrated in FIG. 21, if the installation engine later applies a fifth small update patch (Small 5) that is a superseding member of Family B, Small 3 is superseded in both Family A and Family B and no longer directly applies to the product.

Conditional Sequencing Data

When authoring a single patch to target several related products or a set of SKUs, a patch author may deal with a functionality that exists in one product but not another or is implemented differently in different products. Often, the patch author may express these relationships through multiple families. But since targets of the patch share patch sequencing data, it may be difficult to create metadata that is appropriate for each target. Filtering a product code in the patch sequencing data provides additional sequencing flexibility for multi-target patches to handle such a scenario.

In some cases, a patch author works with a single master package for a product. The patch author then creates multiple types of a product by copying the master package and removing portions that install a functionality specific to a subset of the product. For example, a word processing product may include a spell checker, a grammar checker, a medical dictionary, and a legal dictionary. A master file includes authoring data to install these different components. The "medical" version of the product is the master package with the legal dictionary removed (and with a distinct product code to uniquely identify the software product and to distinguish it from the other SKUs). The "legal" version of the product is the master package with the medical dictionary removed (and again with a distinct product code). The standard version of the product is the master package with both the legal dictionary and the medical dictionary removed. Accordingly, some components exist in different versions of the product whereas other components are specific to a subset of the file.

Figure 22:
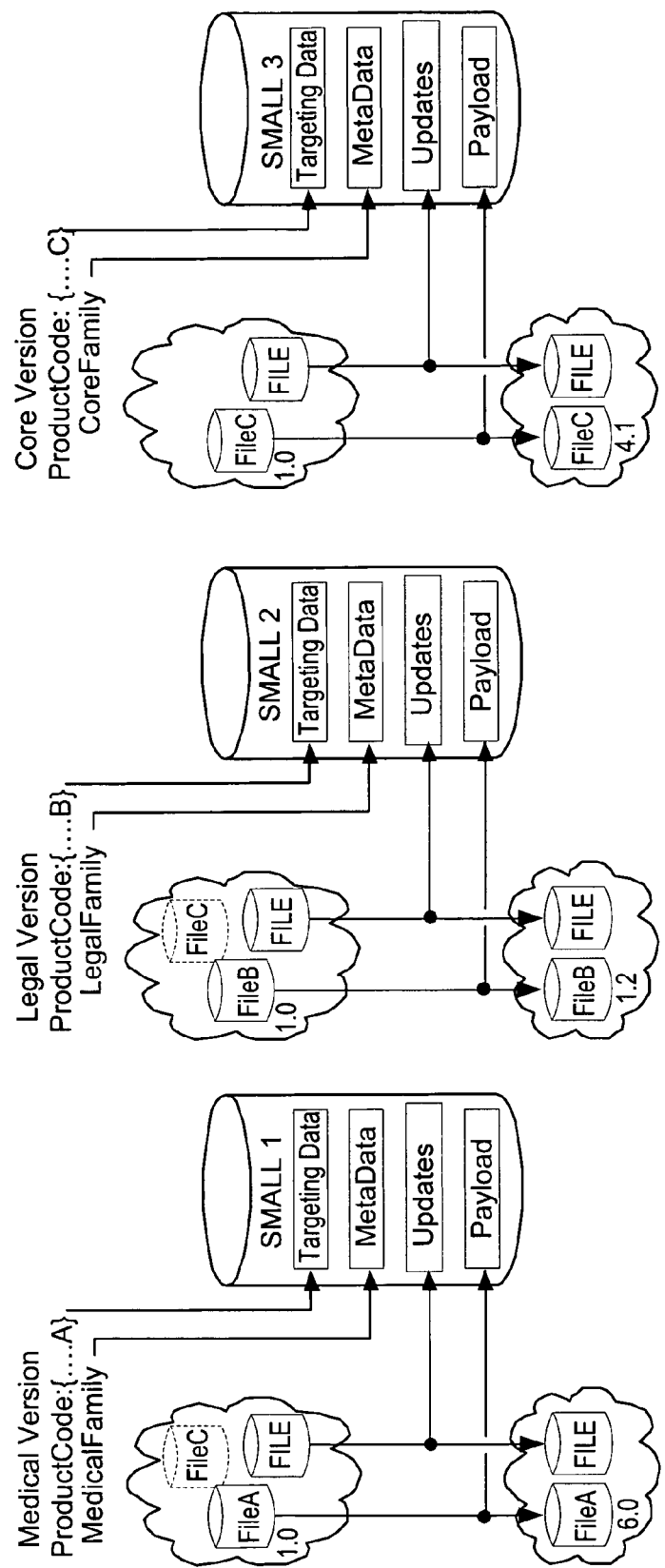
FIG. 22 is a block diagram illustrating a servicing scenario for a product family with independent small update patches according to one embodiment of the invention.

To reduce the potential for confusion about which patches are desired, it may be desirable to release a single patch that targets the different related versions of the product, regardless of the actual components updated by the patch. Conditional families provide the flexibility to handle this scenario by allowing the patch author to change the family membership of the patch based on the target product identity. FIG. 22 provides an example. In this example, a product has been updated by a set of small update patches—one patch for the medical dictionary (targeting the medical version of the product), one for the legal dictionary (targeting the legal version of the product), and one for the spell checker component (targeting any version of the product). Since these three small update patches are independent of each other and target independent versions of the product, they each have their own patch family value.

Figure 23:
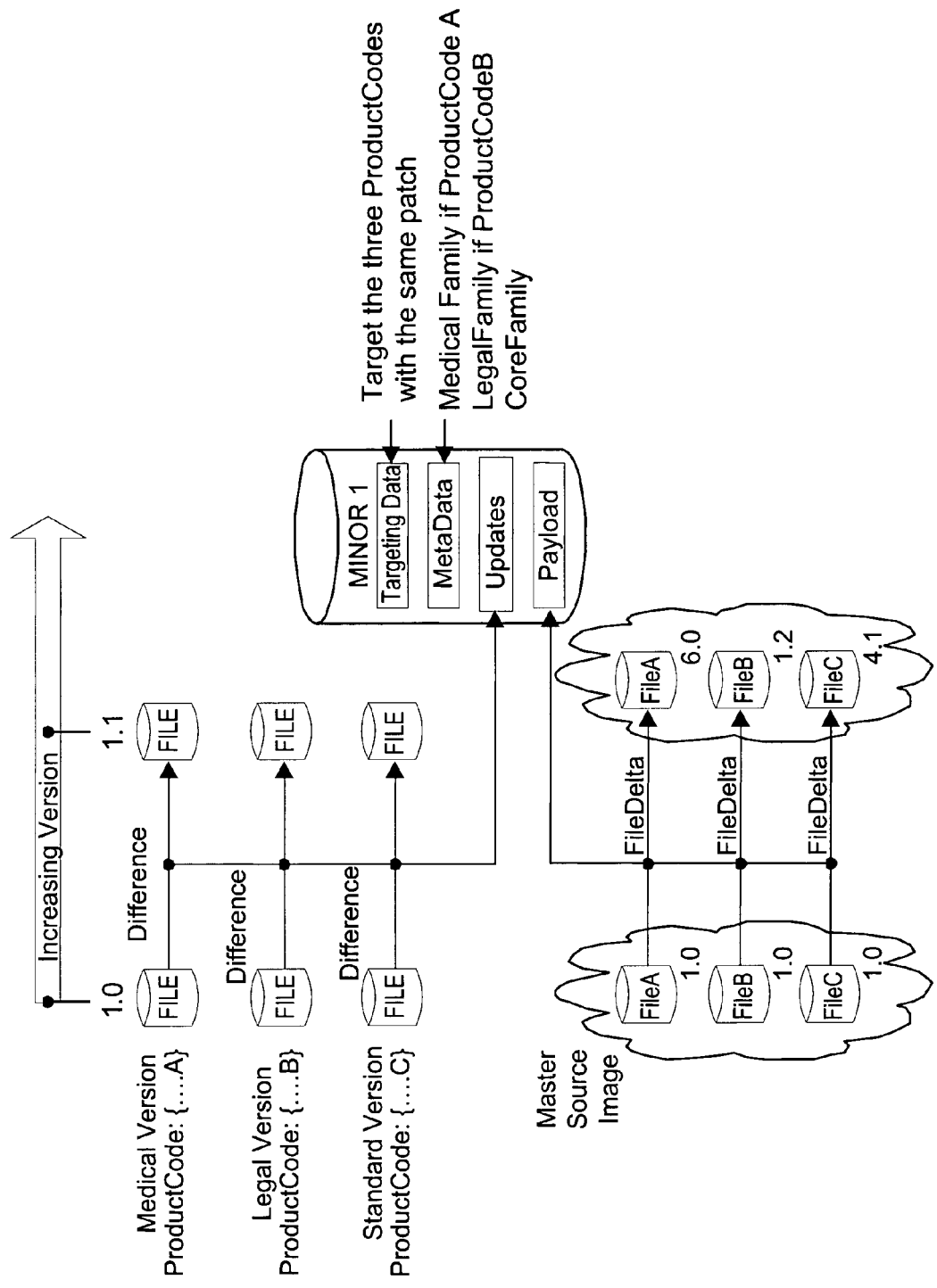
FIG. 23 is a block diagram illustrating a product family serviced by a patch with conditional family membership according to one embodiment of the invention.

Further illustrated in FIG. 23, to ship a single minor upgrade patch that incorporates the previous small update patches, a patch author may use conditional families. The minor upgrade patch includes the fixes for the various components. Since the medical version of the product is the version that includes the medical dictionary component, the patch author makes the medical patch family value conditional based on the product code of the medical version of the product. Thus, when the installation engine applies the patch to the standard or legal versions of the product, it ignores the patch family row.

An alternative solution is to indicate that the minor upgrade patch is a member of the Grammar, Spell, and Medical families. However, as a member of these three families, the minor upgrade patch may not be superseded by a later minor upgrade patch unless these three families are similarly superseded. As a result, the minor upgrade patch for the standard version of the product may not be superseded by a later minor upgrade patch unless a supersedence relationship was declared for portions of the product that do not exist. This difficulty limits the flexibility in targeting future minor upgrade patches.

Changing Family Systems

Sometimes, the servicing model for a product may change over its lifetime. If the existing patch family system becomes inadequate for the new servicing model, a patch author may create patches that switch to a new model without a negative effect.

Figure 24:
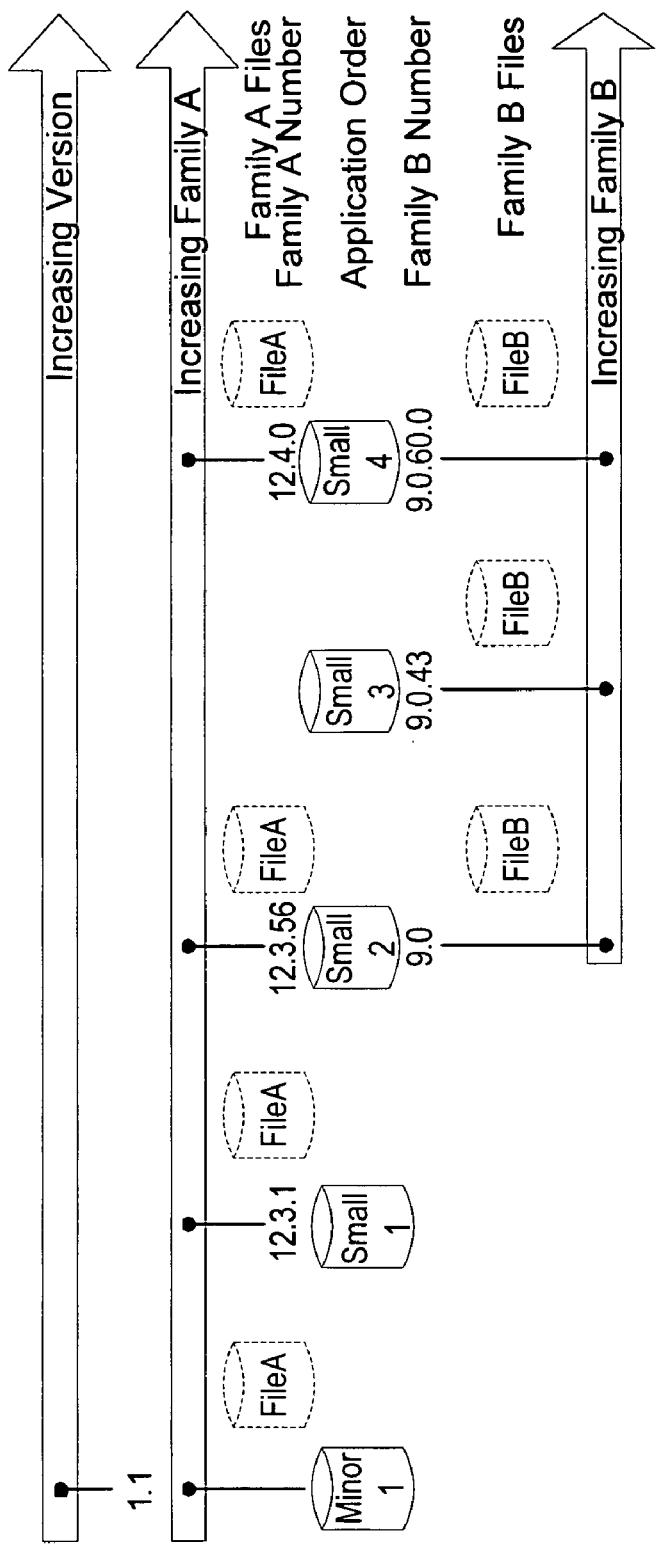
FIG. 24 is a block diagram illustrating adding a patch family to an existing servicing model according to one embodiment of the invention.

There are two approaches when adding additional families to a servicing model—by shrinking the scope of an existing family and by adding a new family as a subset of the existing family scope. To shrink the scope of an existing family, the patch author examines the prior patches in the existing family for commonality in an updated functionality and treats the family as if it were intended to cover those portions of the product that have already been updated. The patch author places future updates to other portions of the product in their own family. FIG. 24 illustrates this approach, which places no authoring restriction on future patches and is possible when existing patches update related functionalities in the product.

The patch author may also add a family by adding the new family as a subset of an existing family. In this approach, the existing family remains as the product-wide family, and the new family orders future patches in each area of functionality. Future patches are members of both Family A (to achieve correct sequencing against older patches) and the new Family B (to sequence against newer patches). If this approach, the sequence number for Family A does not change in future patches. This allows the new family to assume a responsibility for sequencing patches. If the sequence number in Family A does not change in a future patch, the patch author creates the future patch such that the sequence in Family A does not contradict the sequence in other families for the product.

Figure 25:
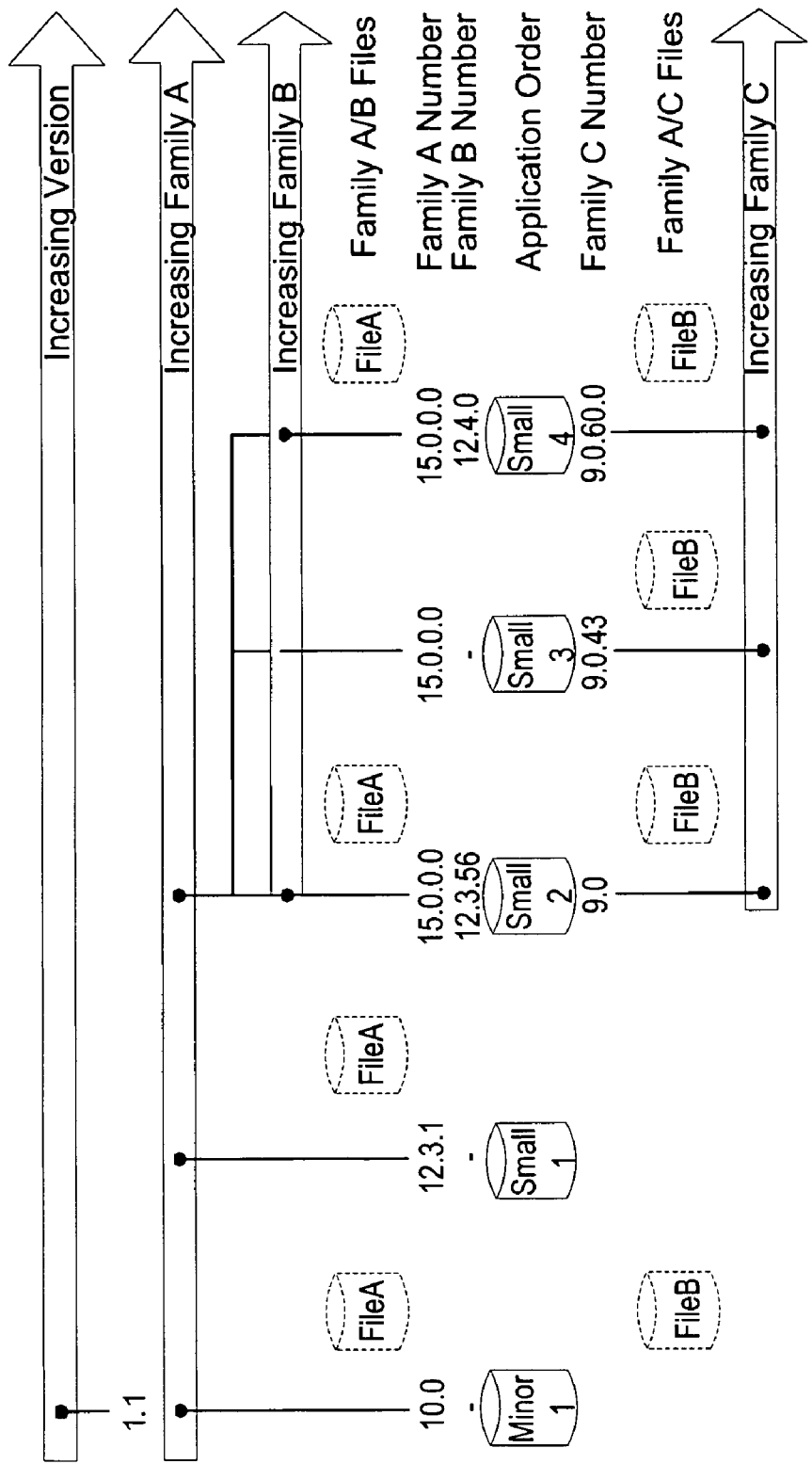
FIG. 25 is a block diagram illustrating adding a patch family to an existing servicing model when files in new patch families have previously been updated according to one embodiment of the invention.

As an example of the two approaches, consider the case where existing patches for a product have been shipped as members of a single patch family—Family A. If these prior patches update the spell checker of the product, the patch author may begin identify Family A as the "spell checker" patch family. If the patch author releases a future patch for the grammar checker, he or she may place this future patch in a brand new family that exists side-by-side with the existing family. The alternative solution is to leave Family A as the family for the single product and define a new "grammar checker" family (Family B), as illustrated in FIG. 25. Therefore, any future spell checker fixes may be placed in Family A or in a new family (Family C) within the scope of Family A.

In some cases, after a patch family has been used in a servicing model for a product, the patch family is considered for future patches. However, there are two ways to remove a patch family from consideration in servicing a product—by abandoning the family sequence and by creating a particular baseline.

To abandon a particular sequence, a patch author may lock the sequence number for a particular patch family at a specific value and to use that value for future patches. Since sequence values are the same in the family, they are essentially irrelevant when sequencing future patches. The sequencing logic for the new patches then comes from other families. An incorrect sequencing behavior may result if the new patches are not members of at least one other family. The disadvantage of this approach is that future patches include the abandoned patch family data such that they are correctly sequenced after existing patches that are members of the abandoned family.

Figure 26:
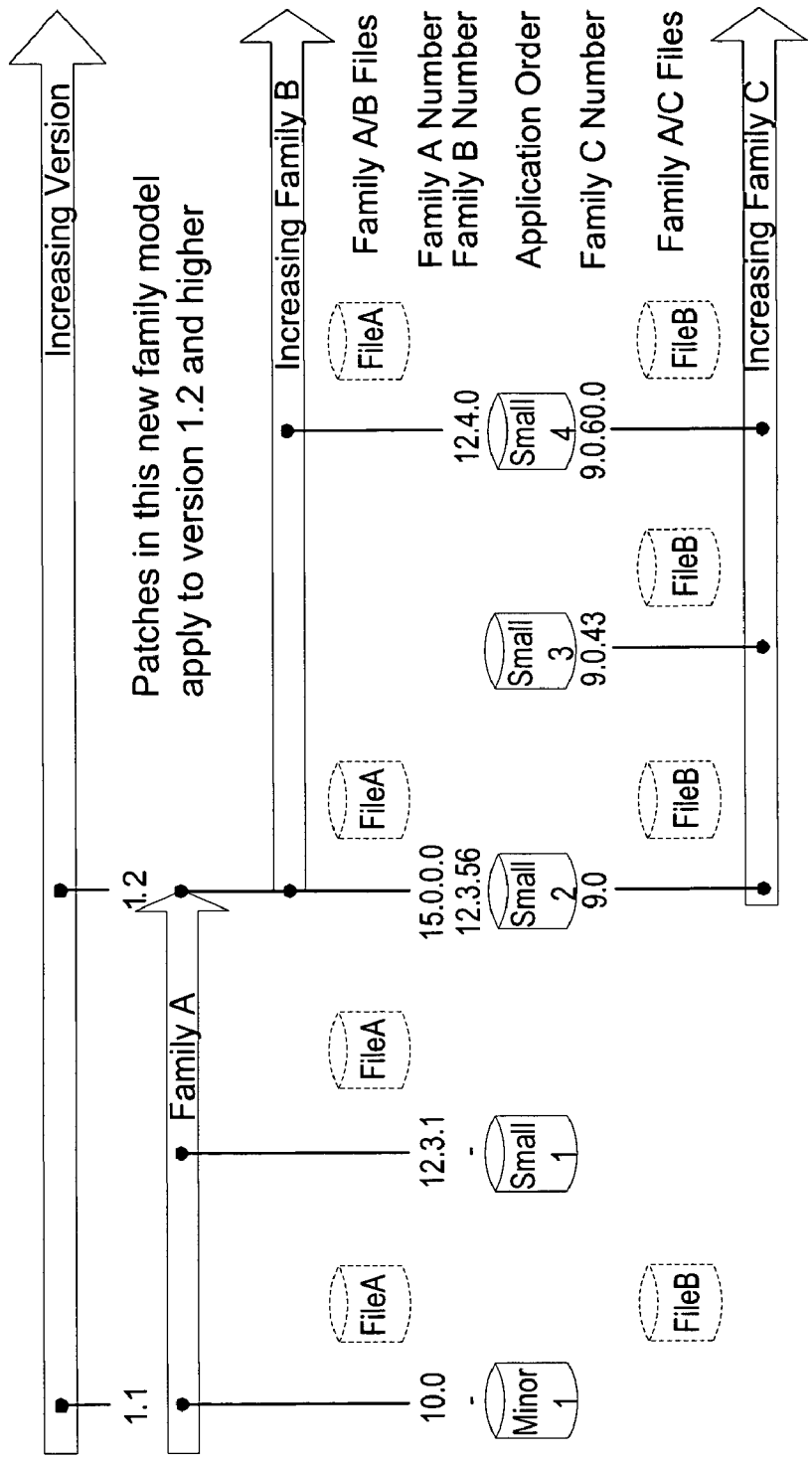
FIG. 26 is a block diagram illustrating abandoning a patch family from an existing servicing model according to one embodiment of the invention.

The other approach to remove a family from consideration is to create a minor upgrade patch that supersedes earlier patches in different families and that provides initial values for a new patch family sequence, as illustrated in FIG. 26. In this approach, if future patches target the new version of the product, the patch author may decide not to include the older patch families' data in these future patches. The disadvantage to this approach is that the future patches target either the new version of the product or older versions of the product. Thus, a patch that targeted multiple versions of the product may be desired to include both old and new family data to achieve proper sequencing. This may reintroduce the old families into the sequencing model and negate the attempt to abandon a family. This restriction also means that the minor upgrade patch may not be uninstalled without removing later patches because the later patches may not target the earlier version of the product.

What is claimed is:

1. A method of updating a software product by a plurality of patches, said method comprising:

identifying sequencing data from each of existing patches of the software product that have already been applied to a target machine, wherein said sequencing data indicating a portion of the software product of which the patch is a member and a relative ordering between the patch and one or more other members of the portion;

at the target machine, receiving the plurality of patches grouped in a family of patches to be applied to a the target machine from a patch author independent of user interactions, wherein said received plurality of patches and the existing patches belong to the same family of patches for the software product;

in response to the received plurality of patches, receiving sequencing data of each patch of the plurality of patches from the patch author at the target machine, each patch of the plurality of patches in the family of patches having a defined membership in a portion of the software product and having a defined order in the portion relative to one or more other patches in the family of patches that are members of the portion, said sequencing data being explicitly set by the patch author by creating a sequencing table with explicit values for various sequencing behaviors and overriding the defined order for updating the software product based on the defined membership of the patches in the family of patches;

determining a logical order of application for the plurality of patches based on the received sequencing data of the plurality of patches and the identified sequencing data from each of the existing patches in the family of patches; and applying the plurality of patches to the software product according to the determined logical order of application.

2. The method of claim 1 wherein one or more patches of the plurality of patches have defined memberships in more than one portion of the software product.

3. The method of claim 1 wherein each patch of the plurality of patches declares its membership in the portion of the software product independently of other patches in the plurality of patches.

4. The method of claim 1 wherein determining the logical order of application comprises:
   determining a version of the software product that the plurality of patches targets for updating the software product,
   identifying a target portion of the software product for the determined version,
   determining which one or more patches of the plurality of patches are members of the identified target portion based on the received sequencing data, and
   sorting the one or more patches that are members of the identified target portion according to the relative ordering indicated in the received sequencing data.

5. The method of claim 4 wherein sorting the one or more patches that are members of the identified target component comprises generating a partial-order relationship between the one or more patches based on the received sequencing data and generating a sorted order based on the partial-order relationship.

6. The method of claim 4 wherein determining the version of the software product comprises:
   creating a sorted list of patches, said sorted list of patches including one or more of the following: one or more major upgrade patches being applied to the software product, one or more major upgrade patches already applied to the software product, one or more minor upgrade patches being applied to the software product, and one or more minor upgrade patches already applied to the product; and
   assigning each of the plurality of patches to one or more versions of the software product, said one or more versions of the software product being determined based on the sorted list.

7. The method of claim 6 wherein determining the version of the software product further comprises removing one or more superseded patches from the created sorted list.

8. The method of claim 1 wherein applying the plurality of patches to the software product comprises:
   determining a desired state of the software product based on the determined logical order of application,
   determining a current state of the software product, and
   applying the plurality of patches to the software product as a function of the determined current state of the software product and the determined desired state of the software product.

9. The method of claim 8 further comprising:
   determining a new state of the software product in response to applying the plurality of patches to the software product, and
   storing the determined new state of the software product in a memory area.

10. The method of claim 1 further comprising receiving sequencing data of one or more patches already applied to the software product, and wherein determining the logical order of application comprises determining a logical sequence among the plurality of patches and the one or more patches already applied to the software product based on the received sequencing data.

11. The method of claim 1 wherein determining the logical order of application comprises combining partial-order relationships of more than one plurality of patches, wherein each plurality of patches targets a different portion of the software product.

12. The method of claim 11 wherein one or more patches of the more than one plurality of patches are members in multiple portions of the software product.

13. The method of claim 1 wherein receiving the sequencing data comprises receiving the sequencing data including supersedence information regarding each of the plurality of patches, and further comprising identifying a superseded patch in the plurality of patches based on the received sequencing data and removing the superseded patch from the determined logical order of application.

14. The method of claim 1 further comprising automatically generating the sequencing data for each of the plurality of patches if the plurality of patches targets a single portion of the software product to update the software product.

15. The method of claim 14 wherein automatically generating the sequencing data for each of the plurality of patches comprises associating each of the plurality of patches with an identifier of the software product and assigning a relative order for each of the plurality of patches based on a date and time that each patch is created.

16. The method of claim 1 wherein one or more computer storage media have computer-executable instructions for performing the method recited in claim 1.

17. The method of claim 1, further comprising using one or more computer storage media having stored thereon a data structure for updating the software product by the plurality of patches, said data structure comprising:
   a patch family field for storing data relating to the family of patches, said patch family field indicating a portion of the software product that a patch within the family of patches targets for updating the software product, and
   a sequence field for storing the sequencing data indicating the relative ordering between a patch and one or more other patches that also target the portion for updating the software product as stored in the patch family field, said data in the sequence field being explicitly set by a patch author by creating a sequencing table with explicit values for various sequencing behaviors and overriding the relative order between the patch and one or more other patches.

18. The method of claim 17 wherein the data structure further comprises a product code field for storing data indicating an identifier of the software product, the data stored in the product code field being used to control a sequencing behavior for the software product.

19. The computer-readable media of claim 17 wherein the data structure further comprises an attributes field for storing data identifying an attribute of the patch.

20. The method of claim 19 wherein a processor is configured to determine a logical order of application for the plurality of patches by:
   identifying one or more patches that target the same portion for updating the software product as indicated by the data in the patch family field,
   sorting the one or more patches by their relative orderings as indicated by the data stored in the sequence field.

21. The computer-readable media of claim 20 wherein the processor is configured to apply the one or more patches to the software product by increasing relative orderings of the one or more patches in response to sorting the one or more patches.

22. The method of claim 20 wherein the data stored in the attributes field indicates if the patch supersedes an earlier patch that also targets the portion for updating the software product, and wherein the processor is configured to remove the earlier patch from the logical order of application if the data stored in the attributes field indicates that the patch supersedes the earlier patch.

23. A system for updating a software product by a plurality of patches, said system comprising:
sequencing data for each patch of the plurality of patches to be applied to a target machine and each of the existing patches of the software product that have already been applied to the target machine, wherein the plurality of patches and the existing patches belong to a family of patches for the software product, each patch of the plurality of patches in the family of patches having a defined membership in a portion of the software product and having a defined order in the portion relative to one or more other patches in the family of patches that are members of the portion, said sequencing data indicating a portion of the software product of which the patch is a member and a relative ordering between the patch and one or more other members of the portion, said sequencing data being explicitly set by the patch author by creating a sequencing table with explicit values for various sequencing behaviors and overriding the defined order for updating the software product based on the defined membership of the patches in the family of patches;
a processor configured to receive the plurality of patches grouped the family of patches and configured to receive the sequencing data from a patch author and to determine a logical order of application for the plurality of patches based on the received sequencing data of the plurality of patches and the sequencing data from each of the existing patches in the family of patches; and
wherein the processor is configured to apply the plurality of patches to the software product in accordance with the determined logical order of application.

24. The system of claim 23 wherein the processor is configured to:
determine a version of the software product that the plurality of patches targets for updating the software product,
identify a target portion of the software product for the determined version,
determine which one or more patches of the plurality of patches are members of the identified target portion based on the received sequencing data, and
sort the one or more patches that are members of the identified target portion according to the relative ordering indicated in the received sequencing data.

25. The system of claim 24 wherein the processor is configured to determine the version of the software product by:
creating a sorted list of patches, said sorted list of patches including one or more of the following: one or more major upgrade patches being applied to the software product, one or more major upgrade patches already applied to the software product, one or more minor upgrade patches being applied to the software product, and one or more minor upgrade patches already applied to the product; and
assigning each of the plurality of patches to one or more versions of the software product, said one or more versions of the software product being determined based on the sorted list.

26. The system of claim 23 wherein the processor is configured to:
determine a desired state of the software product based on the determined logical order of application,
determine a current state of the software product, and
apply the plurality of patches to the software product as a function of the determined current state of the software product and the determined desired state of the software product.

27. The system of claim 26 wherein the processor is configured to determine a new state of the software product in response to applying the plurality of patches to the software product, said system further comprising a memory area configured to store the determined new state of the software product.

28. The system of claim 23 wherein the processor is configured to:
receive sequencing data of one or more patches already applied to the software product, and
determine the logical order of application by determining a logical sequence among the plurality of patches and the one or more patches already applied to the software product based on the received sequencing data.

29. The system of claim 23 wherein the sequencing data includes supersedence information regarding each of the plurality of patches, and wherein the processor is configured to identify a superseded patch in the plurality of patches based on the received sequencing data and to remove the superseded patch from the determined logical order of application.

30. The system of claim 23 further comprising a patch-authoring tool configured to automatically generate the sequencing data for each of the plurality of patches if the plurality of patches targets a single portion of the software product to update the software product.

31. The system of claim 30 wherein the patch-authoring tool is configured to automatically generate the sequencing data by associating each of the plurality of patches with an identifier of the software product and assigning a relative order for each of the plurality of patches based on a date and time that each patch is created.

32. One or more computer storage media having computer-executable components for updating a software product by a plurality of patches, said computer-readable media comprising:
a sequencing component for receiving the plurality of patches grouped in a family of patches and receiving sequencing data of each patch of the plurality of patches to be applied to a target machine and each of the existing patches of the software product that have already been applied to the target machine from a user, wherein the plurality of patches and the existing patches belong to the same family of patches for the software product, each patch of the plurality of patches in the family of patches having a defined membership in a portion of the software product and having a defined order in the portion relative to one or more other patches in the family of patches that are members of the portion, said sequencing data indicating a portion of the software product that the patch is a member of and a relative ordering between the patch and one or more other members of the portion, said sequencing sequence data being explicitly set by the user by creating a sequencing table with explicit values for various sequencing behaviors and overriding the defined order, said sequencing component further configured to determine a logical order of application for the plurality of patches based on the received sequencing data of the plurality of patches and the sequencing data from each of the existing patches in the family of patches; and
an application component for executing the plurality of patches on the software product in accordance with the determined logical order of application.

33. The computer storage media of claim 32 wherein the sequencing component is configured to:
- determine a version of the software product that the plurality of patches targets for updating the software product,
- identify a target portion of the software product for the determined version,
- determine which one or more patches of the plurality of patches are members of the identified target portion based on the received sequencing data, and
- sort the or more patches that are member of the identified target portion according to the relative ordering indicated in the received sequencing data.

34. The computer-readable media of claim 33 wherein the sequencing component is configured to:
- create a sorted list of patches, said sorted list of patches including one or more of the following: one or more major upgrade patches being applied to the software product, one or more major upgrade patches already applied to the software product, one or more minor upgrade patches being applied to the software product, and one or patches already applied to the product; and
- assign each of the plurality of patches to one or more versions of the software product, said one or more versions of the software product being determined based on the sorted list.

35. The computer-readable media of claim 32 further comprising a target state evaluation component for determining a desired state of the software product based on the determined logical order of application, and wherein the application component is configured to determine a current state of the software product and to execute the plurality of patches on the software product as a function of the determined current state of the software product and the determined desired state of the software product.

36. The computer storage media of claim 35 wherein the application component is configured to determine a new state of the software product in response to executing the plurality of patches on the software product, said computer-readable media further comprising a memory component for storing the determined new state of the software product.

37. The computer storage media of claim 32 wherein the sequencing component is configured to receive sequencing data of one or more patches already applied to the software product, the sequencing component further configured to determine the logical order of application by determining a logical sequence among the plurality of patches and the one or more patches already applied to the software product based on the received sequencing data.

38. The computer storage media of claim 32 wherein the sequencing data includes supersedence information regarding each of the plurality of patches, and wherein the sequencing component is configured to identify a superseded patch in the plurality of patches based on the received sequencing data and to remove the superseded patch from the determined logical order of application.

39. The computer storage media of claim 32 further comprising an authoring component for automatically generating the sequencing data for each of the plurality of patches if the plurality of patches targets a single portion of the software product to update the software product.

40. The computer storage media of claim 39 wherein the authoring component is configured to automatically generate the sequencing data for each of the plurality of patches by associating each of the plurality of patches with an identifier of the software product and assigning a relative order for each of the plurality of patches based on a date and time that each patch is created.

* * * * *

UNITED STATES PATENT AND TRADEMARK OFFICE
CERTIFICATE OF CORRECTION

PATENT NO. : 7,552,430 B2  
APPLICATION NO. : 10/930656  
DATED : June 23, 2009  
INVENTOR(S) : Carolyn L. Napier et al.

It is certified that error appears in the above-identified patent and that said Letters Patent is hereby corrected as shown below:

In column 34, line 40, in Claim 1, before "the" delete "a".

In column 36, line 47, in Claim 19, delete "computer-readable media" and insert -- method --, therefor.

In column 36, line 56, in Claim 20, after "data" insert -- stored --.

In column 36, line 59, in Claim 21, delete "computer-readable media" and insert -- method --, therefor.

In column 39, line 11, in Claim 33, after "the" insert -- one --.

In column 39, line 11, in Claim 33, delete "member" and insert -- members --, therefor.

In column 39, line 14, in Claim 34, delete "-readable" and insert -- storage --, therefor.

In column 39, line 22, in Claim 34, after "or" insert -- more minor upgrade --.

In column 39, line 27, in Claim 35, delete "-readable" and insert -- storage --, therefor.

Signed and Sealed this
Eighth Day of February, 2011

David J. Kappos
*Director of the United States Patent and Trademark Office*